(12) United States Patent
Zhang

(10) Patent No.: US 11,979,841 B1
(45) Date of Patent: *May 7, 2024

(54) METHOD AND DEVICE IN UE AND BASE STATION FOR POWER ADJUSTMENT

(71) Applicant: Xiaobo Zhang, Shanghai (CN)

(72) Inventor: Xiaobo Zhang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 140 days.

This patent is subject to a terminal disclaimer.

(21) Appl. No.: 17/498,774

(22) Filed: Oct. 12, 2021

Related U.S. Application Data

(63) Continuation of application No. 16/546,317, filed on Aug. 21, 2019, now Pat. No. 11,178,620, which is a continuation of application No. PCT/CN2017/075530, filed on Mar. 3, 2017.

(51) Int. Cl.
*H04W 52/32* (2009.01)
*H04W 72/21* (2023.01)

(52) U.S. Cl.
CPC ......... *H04W 52/325* (2013.01); *H04W 72/21* (2023.01)

(58) Field of Classification Search
CPC .................. H04W 52/325; H04W 72/0413
See application file for complete search history.

(56) References Cited

U.S. PATENT DOCUMENTS

| 11,206,098 B2 * | 12/2021 | Wu ........................ H04L 1/0025 |
| 11,368,960 B2 * | 6/2022 | Zhang ................. H04W 52/242 |
| 2012/0178494 A1 | 7/2012 | Haim |
| 2014/0192738 A1 * | 7/2014 | Nam ..................... H04W 52/346 370/329 |
| 2014/0348078 A1 * | 11/2014 | Kim ....................... H04L 5/0023 370/329 |
| 2016/0100398 A1 * | 4/2016 | Xia ......................... H04L 5/0007 370/330 |
| 2016/0234859 A1 * | 8/2016 | You .................... H04W 72/0446 |

(Continued)

FOREIGN PATENT DOCUMENTS

| CN | 102045823 A | 5/2011 |
| CN | 102378341 A | 3/2012 |

(Continued)

OTHER PUBLICATIONS

Response to the Non-Final Rejection of the U.S. Appl. No. 16/546,317 dated Mar. 26, 2021.

(Continued)

*Primary Examiner* — Tejis Daya

(57) ABSTRACT

The disclosure provides a method and a device in a base station and a User Equipment (UE) for power adjustment. The UE first transmits a first radio signal. The first radio signal occupies T time unit(s) in time domain, and the T is used for determining a first component. A first reference power is in linear correlation with the first component. A transmit power of the first radio signal is a first power, and the first reference power is used for determining the first power. The T is a positive integer. The above method can ensure that the first radio signal keeps a stable coverage in the condition that the first radio signal occupies different numbers of time units.

20 Claims, 9 Drawing Sheets

(56) References Cited

U.S. PATENT DOCUMENTS

| | | | |
|---|---|---|---|
| 2017/0019883 A1 | 1/2017 | Nimbalker | |
| 2017/0064648 A1 | 3/2017 | Park | |
| 2018/0368169 A1* | 12/2018 | Jung | H04W 72/21 |
| 2020/0107317 A1* | 4/2020 | Ryu | H04L 5/0007 |
| 2020/0329434 A1* | 10/2020 | Zhang | H04W 52/36 |
| 2021/0385837 A1* | 12/2021 | Wu | H04W 72/21 |

FOREIGN PATENT DOCUMENTS

| | | |
|---|---|---|
| CN | 105591714 A | 5/2016 |
| WO | 2016137816 A2 | 9/2016 |
| WO | 2016182373 A1 | 11/2016 |

OTHER PUBLICATIONS

Non-Final Rejection of the U.S. Appl. No. 16/546,317 dated Mar. 26, 2021.
ISR received in application No. PCT/CN2017/075530 dated Nov. 24, 2017.
First Office Action received in application No. CN201780003871.0 dated Feb. 19, 2020.
CN201780003871.0 Notification to Grant Patent Right for Invention dated Mar. 19, 2020.
CN201780003871.0 First Search Report dated Mar. 31, 2020.

* cited by examiner

First power = A minimum one among second power and first reference power

First reference power = $10 \times$ Reference component - $10 \times \underbrace{\log_{10}(T1)}_{\log_{10}(T)}$ + Second component + Third component + Fourth component + Fifth component + Sixth component + Seventh component $\uparrow$
$\sum_{i=0}^{R-1}$ First offset #i

METHOD AND DEVICE IN UE AND BASE STATION FOR POWER ADJUSTMENT

CROSS-REFERENCE TO RELATED APPLICATION

This application is a continuation of U.S. patent Ser. No. 16/546,317, filed Aug. 21, 2019, which is a continuation of International Application No. PCT/CN2017/075530, filed Mar. 3, 2017, the full disclosure of which is incorporated herein by reference.

BACKGROUND

Technical Field

The disclosure relates to transmission methods and devices for radio signals in wireless communication systems, and in particular to a transmission scheme and device for radio signals in a wireless communication system supporting power adjustment.

Related Art

According to conclusions of the 3rd Generation Partner Project (3GPP) Radio Access Network (RAN1) #88 session, a Physical Uplink Control Channel (PUCCH) of long duration occupies a variable number of symbols in one slot. According to some 3GPP documents (for example, R1-1701647), the number of symbols occupied by a PUCCH of long duration in one slot varies from 4 to 14. Such a big range of variation would cause a coverage of the PUCCH to change significantly with the number of symbols. How to ensure the PUCCH to keep a stable coverage in the case of different numbers of symbols is a problem to be solved.

SUMMARY

The inventors find through researches that, by introducing into a calculation formula of uplink power a component which is correlated with a number of symbols occupied by a PUCCH in one slot, a transmit power of the PUCCH can be adjusted according to the number of symbols occupied by the PUCCH, thereby keeping a stable PUCCH coverage in the case of different numbers of symbols.

In view of the above problems, the disclosure provides a solution. It should be noted that although the disclosure is originally designed for a PUCCH, the disclosure is also applicable to other physical layer channels. The embodiments of the User Equipment (UE) of the disclosure and the characteristics in the embodiments may be applied to the base station if no conflict is incurred, and vice versa. The embodiments of the disclosure and the characteristics in the embodiments may be mutually combined arbitrarily if no conflict is incurred.

The disclosure provides a method in a UE for power adjustment, wherein the method includes:

transmitting a first radio signal.

Herein, the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, the above method has a following benefit: the transmit power of the first radio signal is adjusted according to the T, thereby ensuring that the first radio signal keeps a stable coverage in the case that the value of the T changes.

In one embodiment, any one of the T time unit(s) is a duration of one wideband symbol.

In one subembodiment, the wideband symbol is an Orthogonal Frequency Division Multiplexing (OFDM) symbol.

In one subembodiment, the wideband symbol is a Discrete Fourier Transform Spread OFDM (DFT-S-OFDM) symbol.

In one subembodiment, the wideband symbol is a Filter Bank Multi Carrier (FBMC) symbol.

In one embodiment, a number of subcarriers occupied by the first radio signal in frequency domain is unrelated to the T.

In one embodiment, frequency domain resources occupied by the first radio signal in frequency domain and time domain resources occupied by the first radio signal in time domain are configured independently.

In one embodiment, the above method has a following benefit: the allocation of frequency domain resources of the first radio signal is unrelated to the T, which simplifies the configuration of the first radio signal in the case that the T is different.

In one embodiment, any one of the T time unit(s) is one slot.

In one embodiment, any one of the T time unit(s) is 1 ms.

In one embodiment, any one of the T time unit(s) is one subframe.

In one embodiment, the T is an integer not less than 4.

In one embodiment, the T is an integer not greater than 14.

In one embodiment, the T is an integer not greater than 14 but not less than 4.

In one embodiment, the T time unit(s) is(are) consecutive in time domain.

In one embodiment, the T time unit(s) is(are) inconsecutive in time domain.

In one embodiment, the first radio signal includes Uplink Control Information (UCI).

In one subembodiment, the UCI includes at least one of a Hybrid Automatic Repeat reQuest-Acknowledgement (HARQ-ACK), Channel State Information (CSI), a Scheduling Request (SR) or a CSI-RS Resource Indication (CRI).

In one embodiment, the first radio signal is transmitted on an uplink physical layer control channel (that is, an uplink physical layer channel that cannot be used to transmit physical layer data).

In one subembodiment, the first radio signal is transmitted on a Physical Uplink Control Channel (PUCCH).

In one subembodiment, the first radio signal is transmitted on a short PUCCH (sPUCCH).

In one subembodiment, the first radio signal is transmitted on a New Radio PUCCH (NR-PUCCH).

In one embodiment, the first reference power is in unit of dBm.

In one embodiment, a linear coefficient between the first reference power and the first component is −1.

In one embodiment, a linear coefficient between the first reference power and the first component is −10, that is, a linear coefficient between the first reference power and the (10*the first component) is −1.

In one embodiment, the first reference power is in linear correlation with a second component, and the second component is a power reference of a PUCCH. A linear coefficient between the first reference power and the second component is 1.

In one subembodiment, the second component is $P_{O\_PUCCH}$, and the $P_{O\_PUCCH}$ is a power reference of a PUCCH. Specific definitions of the $P_{O\_PUCCH}$ can refer to TS36.213.

In one subembodiment, the second component is configured through a higher-layer signaling.

In one subembodiment, the second component is cell specific.

In one embodiment, the first reference power is in linear correlation with a third component, and the third component is correlated with a quality of a channel from the UE to a receiver of the first radio signal. A linear coefficient between the first reference power and the third component is 1.

In one subembodiment, the third component is $PL_c$, the $PL_c$ is an estimated path loss value in unit of dB of the UE in a serving cell with an index of c, and the first radio signal is transmitted in the serving cell with an index of c. Specific definitions of the $PL_c$ can refer to TS36.213.

In one subembodiment, the third component is equal to a transmit power of a given reference signal minus a Reference Signal Received Power (RSRP) of the given reference signal. A transmitter of the given reference signal is a target receiver of the first radio signal, and a receiver of the given reference signal is the UE.

In one embodiment, the first reference power is in linear correlation with a fourth component, and the fourth component is correlated with a format of a PUCCH. A linear coefficient between the first reference power and the fourth component is 1.

In one subembodiment, the fourth component is $\Delta_{F\_PUCCH}(F)$ and the $\Delta_{F\_PUCCH}(F)$ is a power offset between a PUCCH format F and a PUCCH format 1a. Specific definitions of the $\Delta_{F\_PUCCH}(F)$ can refer to T536.213.

In one subembodiment, the PUCCH format includes 1, 1a, 1b, 2, 2a, 2b, 3, 4 or 5.

In one embodiment, the first reference power is in linear correlation with a sixth component or a seventh component respectively, and linear coefficients between the first reference power and the sixth component or the seventh component are 1 respectively. The sixth component is correlated with a format of a PUCCH, and the seventh component is correlated with a number of antenna ports used by the UE to transmit the PUCCH.

In one subembodiment, a PUCCH format corresponding to the first radio signal belongs to 1, 1a, 1b, 2, 2a, 2b or 3.

In one subembodiment, the sixth component is $h(n_{CQI}, n_{HARQ}, n_{SR})$, the $h(n_{CQI}, n_{HARQ}, n_{SR})$ is correlated with a format of a PUCCH, the $n_{CQI}$ represents a number of information bits included in channel quality information, the $n_{HARQ}$ represents a number of information bits of a HARQ-ACK in the ith subframe, and the $n_{SR}$ indicates whether the ith subframe carries a Scheduling Request (SR). Specific definitions of the $h(n_{CQI}, n_{HARQ}, n_{SR})$, the $n_{CQI}$, the $n_{HARQ}$ and the $n_{SR}$ can refer to TS36.213.

In one subembodiment, the seventh component is $\Delta_{TxD}(F')$. When the UE is configured through a higher-layer signaling to transmit a PUCCH on two antenna ports, the $\Delta_{TxD}(F')$ is obtained by configuring each PUCCH format through a higher-layer signaling; otherwise, the $\Delta_{TxD}(F')$ is equal to 0. Specific definitions of the $\Delta_{TxD}(F')$ can refer to TS36.213.

In one subembodiment, the seventh component is configured through a higher-layer signaling.

In one subembodiment, the seventh component is cell specific.

In one embodiment, the first reference power is in linear correlation with an eighth component or a ninth component respectively, and linear coefficients between the first reference power and the eighth component or the ninth component are 1 respectively. The eighth component is correlated with a bandwidth occupied by the first radio signal, and the ninth component is correlated with a Modulation and Coding Scheme (MCS) of the first radio signal.

In one subembodiment, a PUCCH format corresponding to the first radio signal belongs to 4 or 5.

In one subembodiment, the eighth component is $10 \log_{10}(M_{PUCCH,c}(i))$, the $10 \log_{10}(M_{PUCCH,c}(i))$ is a bandwidth in unit of resource block allocated to a PUCCH in the ith subframe in a serving cell with an index of c, and the first radio signal is transmitted in the serving cell with an index of c. Specific definitions of the $10 \log_{10}(M_{PUCCH,c}(i))$ can refer to TS36.213.

In one subembodiment, the ninth component is $\Delta_{TF,c}(i)$, the $\Delta_{TF,c}(i)$ is a power offset correlated with an MCS of the first radio signal in the ith subframe in a serving cell with an index of c, and the first radio signal is transmitted in the serving cell with an index of c. Specific definitions of the $\Delta_{TF,c}(i)$ can refer to TS36.213.

In one subembodiment, the ninth component is configured through a higher-layer signaling.

In one subembodiment, the ninth component is cell specific.

In one subembodiment, the first power is in unit of dBm.

In one embodiment, the first power is $P_{PUCCH}(i)$, the $P_{PUCCH}(i)$ is a transmit power on a PUCCH in the ith subframe in a serving cell with an index of c, and the first radio signal is transmitted in the serving cell with an index of c. Specific definitions of the $P_{PUCCH}(i)$ can refer to TS36.213.

In one embodiment, the first power is equal to the first reference power, and the first reference power is less than a second power.

In one embodiment, the first power is equal to a minimum one among the first reference power and a second power.

In one embodiment, the second power is a fixed constant.

In one embodiment, a higher-layer signaling is used for determining the second power.

In one embodiment, the second power is $P_{CMAX,c}(i)$, $P_{CMAX,c}(i)$, the is a transmit power highest-threshold configured by the UE in the ith subframe in a serving cell with an index of c, and the first radio signal is transmitted in the serving cell with an index of c. Specific definitions of the $P_{CMAX,c}(i)$ can refer to TS36.213.

Specifically, according to one aspect, the method includes:

receiving R first signaling(s).

Herein, the R first signaling(s) is(are) used for determining R first offset(s) respectively, the first reference power is in linear correlation with a summation of the R first offset(s), and the R is a positive integer.

Specifically, according to one aspect, the method includes:

receiving R first signaling(s); and receiving a second radio signal.

Herein, the R first signaling(s) is(are) used for determining R first offset(s) respectively, the first reference power is in linear correlation with a summation of the R first offset(s), and the R is a positive integer; a target first signaling is a latest first signaling among the R first signaling(s), the target first signaling includes scheduling information of the second radio signal, and the scheduling information includes at least one of occupied time domain resources, occupied frequency domain resources, an MCS, a HARQ process number, a Redundancy Version (RV) and a New Data Indicator (NDI).

In one embodiment, the R first signaling(s) schedule(s) one same carrier.

In one embodiment, the R first signaling(s) is(are) physical layer signaling(s) respectively.

In one embodiment, the R first signaling(s) is(are) dynamic signaling(s) respectively.

In one embodiment, the R first signaling(s) is(are) dynamic signaling(s) for downlink grant respectively.

In one embodiment, the R first signaling(s) indicate(s) R first offset(s) respectively.

In one embodiment, the R first signaling(s) is(are) transmitted on downlink physical layer control channel(s) (that is, downlink channel(s) capable of carrying physical layer signaling(s) only) respectively.

In one subembodiment, the downlink physical layer control channel is a Physical Downlink Control Channel (PDCCH).

In one subembodiment, the downlink physical layer control channel is a short PDCCH (sPDCCH).

In one subembodiment, the downlink physical layer control channel is a New Radio PDCCH (NR-PDCCH).

In one embodiment, the R first offset(s) is(are) indicated by Transmitter Power Control(s) (TPC(s)) respectively.

In one embodiment, a linear coefficient between the first reference power and a summation of the R first offset(s) is 1.

In one embodiment, the first reference power is in linear correlation with a fifth component, and the R first offset(s) is(are) used for determining the fifth component. A linear coefficient between the first reference power and the fifth component is 1.

In one subembodiment, the fifth component is in linear correlation with a summation of the R first offset(s), and a linear coefficient between the fifth component and the summation of the R first offset(s) is 1.

In one subembodiment, the fifth component is g(i), and the g(i) is a current state of power control adjustment on a PUCCH. Specific definitions of the g(i) can refer to TS36.213.

In one embodiment, the target first signaling is used for determining partial or full configuration information of the first radio signal, and the configuration information of the first radio signal includes at least one of occupied time domain resources, occupied frequency domain resources, occupied code domain resources, a cyclic shift, an Orthogonal Cover Code (OCC), a PUCCH format or a UCI content.

In one subembodiment, the target first signaling indicates implicitly partial or full configuration information of the first radio signal.

In one subembodiment, the target first signaling indicates explicitly partial or full configuration information of the first radio signal.

In one subembodiment, the target first signaling indicates explicitly one part of the configuration information of the first radio signal, and the target first signaling indicates implicitly the other part of the configuration information of the first radio signal.

In one embodiment, the second radio signal is transmitted on a downlink physical layer data channel (that is, a downlink channel capable of carrying physical layer data)

In one subembodiment, the second radio signal is transmitted on a Physical Downlink Shared Channel (PDSCH).

Specifically, according to one aspect of the disclosure, the first component is equal to a base-10 logarithm of the T.

In one embodiment, a linear coefficient between the first reference power and the first component is −10, that is, a linear coefficient between the first reference power and the (10*the first component) is −1.

Specifically, according to one aspect of the disclosure, the first reference power is in linear correlation with a base-10 logarithm of T1, and the T1 is a positive integer;

In one embodiment, a linear coefficient between the first reference power and the base-10 logarithm of T1 is 10.

In one embodiment, an absolute value of the linear coefficient between the first reference power and the base-10 logarithm of T1 is equal to an absolute value of the linear coefficient between the first reference power and the first component.

In one embodiment, the linear coefficient between the first reference power and the base-10 logarithm of T1 is equal to −1 multiplied by the linear coefficient between the first reference power and the first component.

In one embodiment, the T1 is fixed.

In one embodiment, the T1 is configured through a higher-layer signaling.

In one embodiment, the T1 is semi-static.

In one embodiment, the T1 is cell specific.

In one embodiment, the T1 is UE specific.

In one embodiment, the T1 is a positive integer not greater than 14.

In one embodiment, the T1 is equal to 1.

In one embodiment, the T1 is equal to 4.

In one embodiment, the T1 is equal to 14.

Specifically, according to one aspect, the first radio signal includes T sub-signal(s), the T sub-signal(s) is(are) transmitted on the T time unit(s) respectively, each of the T sub-signal(s) carries a first bit block, and the first bit block includes a positive integer number of bit(s).

In one embodiment, the above method has a following benefit: the modulation coding and resource mapping mode of the first radio signal is enabled to flexibly extend to different values of the T.

In one embodiment, the T sub-signal(s) is(are) transmitted by a same antenna port group, and the antenna port group includes a positive integer number of antenna ports.

In one embodiment, the antenna port is formed by multiple antennas through antenna virtualization superposition, and mapping coefficients from the multiple antennas to the antenna port constitute a beamforming vector.

Specifically, according to one aspect of the disclosure, the method includes:

receiving downlink information.

Herein, the downlink information is used for determining the T time unit(s); or the downlink information is used for determining configuration information of the first radio signal, and the configuration information of the first radio signal includes at least one of occupied time domain resources, occupied frequency domain resources, occupied code domain resources, a cyclic shift, an OCC, a PUCCH format or a UCI content.

In one embodiment, the downlink information is used for determining the T time unit(s), and the downlink information is used for determining configuration information of the first radio signal.

In one embodiment, the downlink information is used for determining a transmission direction of a target time resource pool, the transmission direction is one in a candidate direction set, the candidate direction set includes uplink or downlink, and the T time unit(s) belong(s) to time unit(s)

in the target time resource pool corresponding to the uplink transmission direction; the target time resource pool includes a positive integer number of time unit(s).

In one subembodiment, the candidate direction set further includes sidelink.

In one subembodiment, the target time resource pool includes a positive integer number of consecutive time unit(s).

In one subembodiment, the target time resource pool is one slot.

In one subembodiment, the target time resource pool is 1 ms.

In one subembodiment, the target time resource pool is one subframe.

In one embodiment, all time units in the target time resource pool corresponding to the uplink transmission direction constitute an uplink time unit set, and the T time unit(s) belong(s) to the uplink time unit set.

In one subembodiment, a number of time units included in the uplink time unit set is equal to the T.

In one subembodiment, a number of time units included in the uplink time unit set is greater than the T.

In one subembodiment, the downlink information indicates the T.

In one subembodiment, the downlink information indicates positions of the T time unit(s) in the uplink time unit set.

In one embodiment, all time units in the target time resource pool correspond to a same transmission direction.

In one embodiment, at least two time units in the target time resource pool correspond to different transmission directions.

In one embodiment, the downlink information is used for determining M piece(s) of configuration information, and the configuration information of the first radio signal is one of the M piece(s) of configuration information. The M is a positive integer.

In one subembodiment, the M is equal to 1, and the downlink information is carried by the target first signaling.

In one subembodiment, the M is greater than 1, and the target first signaling is used for determining from the M pieces of configuration information the configuration information of the first radio signal.

In one subembodiment, the M is greater than 1, and the target first signaling indicates an index of the configuration information of the first radio signal in the M pieces of configuration information.

In one embodiment, the downlink information is used for determining Q time domain resource(s), the T time unit(s) is(are) one of the Q time domain resource(s), and the Q is a positive integer; any one of the Q time domain resource(s) includes a positive integer number of time unit(s).

In one subembodiment, the downlink information indicates explicitly the Q time domain resource(s).

In one subembodiment, the downlink information indicates implicitly the Q time domain resource(s).

In one subembodiment, any one of the Q time domain resource(s) includes a positive integer number of consecutive time units.

In one subembodiment, any two of the Q time domain resource(s) are inconsecutive in time domain.

In one subembodiment, the Q is equal to 1, and the downlink information is carried by the target first signaling.

In one subembodiment, the Q is greater than 1, and the target first signaling is used for determining from the Q time domain resources the time domain resource(s) to which the T time unit(s) belong(s).

In one embodiment, the size of frequency domain resources occupied by the first radio signal in frequency domain is unrelated to the T.

In one embodiment, frequency domain resources occupied by the first radio signal in frequency domain and time domain resources occupied by the first radio signal in time domain are configured independently.

In one embodiment, the downlink information is carried by a higher-layer signaling.

In one subembodiment, the downlink information is carried by a Radio Resource Control (RRC) signaling.

In one embodiment, the downlink information is cell specific.

In one embodiment, the downlink information is UE specific.

In one embodiment, the downlink information is carried by a physical layer signaling.

Specifically, according to one aspect of the disclosure, the method includes:

receiving a second signaling.

Herein, the second signaling is used for triggering transmission of the first radio signal.

In one embodiment, the second signaling is a higher-layer signaling.

In one embodiment, the second signaling is a Medium Access Control Layer Control Element (MAC CE) signaling.

In one embodiment, the second signaling is a physical layer signaling.

In one embodiment, the second signaling is a dynamic signaling.

In one embodiment, the second signaling is further used for determining partial configuration information of the first radio signal, and the configuration information of the first radio signal includes at least one of occupied time domain resources, occupied frequency domain resources, occupied code domain resources, a cyclic shift, an OCC, a PUCCH format or a UCI content.

In one subembodiment, the second signaling indicates the partial configuration information of the first radio signal.

In one embodiment, the downlink information is used for determining M pieces of configuration information, the configuration information of the first radio signal is one of the M pieces of configuration information, the second signaling is used for determining the configuration information of the first radio signal from the M pieces of configuration information. The M is a positive integer greater than 1.

In one subembodiment, the second signaling indicates an index of the configuration information of the first radio signal in the M pieces of configuration information.

Specifically, according to one aspect of the disclosure, the R first signaling(s each) include(s) a first field, and the first field in each of the R first signaling(s) has a value equal to a first index; and the first index is an integer.

In one embodiment, the first index is an index of a target beamforming vector in Q1 beamforming vectors. The target beamforming vector is used for transmitting the first radio signal; or the target beamforming vector is used for receiving the first radio signal. The Q1 is a positive integer greater than 1.

In one embodiment, the first index is an index of a target beamforming vector group in Q2 beamforming vector groups, and any one of the Q2 beamforming vector groups includes a positive integer number of beamforming vector(s). A target beamforming vector is used for transmitting the first radio signal; or a target beamforming vector is used for receiving the first radio signal. The target beamforming vector belongs to the target beamforming vector group. The Q2 is a positive integer greater than 1.

In one embodiment, the first index is an index of a target vector pair in Q3 vector pairs, any one of the Q3 vector pairs includes two vectors, and the target vector pair includes a target transmitting beamforming vector or a target receiving beamforming vector. The target transmitting beamforming vector is used for transmitting the first radio signal, and the target receiving beamforming vector is used for receiving the first radio signal. The Q3 is a positive integer greater than 1.

In one embodiment, the first index is an index of a target antenna group in Q4 antenna groups, and any one of the Q4 antenna groups includes a positive integer number of antennas. The target antenna group is used for transmitting the first radio signal; or the target antenna group is used for receiving the first radio signal. The Q4 is a positive integer greater than 1.

In one embodiment, the first index is an index of a target layer in Q5 layers. The first radio signal is transmitted on the target layer. The Q5 is a positive integer greater than 1.

In one embodiment, the first index is an index of a target layer group in Q6 layer groups. Any one of the Q6 layer groups includes a positive integer number of layer(s). The first radio signal is transmitted on a target layer, and the target layer belongs to the target layer group. The Q6 is a positive integer greater than 1.

In one embodiment, the first index indicates a waveform of the first radio signal. The waveform is one of Cyclic prefix Orthogonal Frequency Division Multiplexing (CP-OFDM) or Discrete Fourier Transform Spread OFDM (DFT-s-OFDM).

In one embodiment, the first field includes 2 bits.
In one embodiment, the first field includes 3 bits.
In one embodiment, the first field includes 4 bits.
In one embodiment, the first field includes 5 bits.
In one embodiment, the first field includes 6 bits.
In one embodiment, the first index is a non-negative integer.

The disclosure provides a method in a base station for power adjustment, wherein the method includes:
receiving a first radio signal.

Herein, the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, a number of subcarriers occupied by the first radio signal in frequency domain is unrelated to the T.

In one embodiment, frequency domain resources occupied by the first radio signal in frequency domain and time domain resources occupied by the first radio signal in time domain are configured independently.

In one embodiment, the first radio signal includes a UCI.

Specifically, according to one aspect of the disclosure, the method includes:
transmitting R first signaling(s).

Herein, the R first signaling(s) is(are) used for determining R first offset(s) respectively, the first reference power is in linear correlation with a summation of the R first offset(s), and the R is a positive integer.

Specifically, according to one aspect of the disclosure, the method includes:
transmitting R first signaling(s); and
transmitting a second radio signal.

Herein, the R first signaling(s) is(are) used for determining R first offset(s) respectively, the first reference power is in linear correlation with a summation of the R first offset(s), and the R is a positive integer; a target first signaling is a latest first signaling among the R first signaling(s), the target first signaling includes scheduling information of the second radio signal, and the scheduling information includes at least one of occupied time domain resources, occupied frequency domain resources, an MCS, a HARQ process number, an RV and an NDI.

In one embodiment, the R first signaling(s) schedule(s) one same carrier.

In one embodiment, the R first signaling(s) is(are) dynamic signaling(s) respectively.

In one embodiment, the R first signaling(s) is(are) dynamic signaling(s) for downlink grant respectively.

In one embodiment, the R first offset(s) is(are) indicated by TPC(s) respectively.

Specifically, according to one aspect of the disclosure, the first component is equal to a base-10 logarithm of the T.

In one embodiment, a linear coefficient between the first reference power and the first component is −10, that is, a linear coefficient between the first reference power and the (10*the first component) is −1.

Specifically, according to one aspect of the disclosure, the first reference power is in linear correlation with a base-10 logarithm of T1, and the T1 is a positive integer.

In one embodiment, a linear coefficient between the first reference power and the base-10 logarithm of T1 is 10.

Specifically, according to one aspect of the disclosure, the first radio signal includes T sub-signal(s), the T sub-signal(s) is(are) transmitted on the T time unit(s) respectively, each of the T sub-signal(s) carries a first bit block, and the first bit block includes a positive integer number of bit(s).

Specifically, according to one aspect of the disclosure, the method includes:
transmitting downlink information.

Herein, the downlink information is used for determining the T time unit(s); or the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

Specifically, according to one aspect of the disclosure, the method includes:
transmitting a second signaling.

Herein, the second signaling is used for triggering transmission of the first radio signal.

Specifically, according to one aspect of the disclosure, the R first signaling(s each) include(s) a first field, and the first field in each of the R first signaling(s) has a value equal to a first index; and the first index is an integer.

The disclosure provides a UE for power adjustment, wherein the UE includes:
a first transmitter, to transmit a first radio signal.

Herein, the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, the above UE for power adjustment is characterized in that: the first component is equal to a base-10 logarithm of the T.

In one embodiment, the above UE for power adjustment is characterized in that: the first reference power is in linear correlation with a base-10 logarithm of T1, and the T1 is a positive integer;

In one embodiment, the above UE for power adjustment is characterized in that: the first radio signal includes T sub-signal(s), the T sub-signal(s) is(are) transmitted on the T time unit(s) respectively, each of the T sub-signal(s) carries a first bit block, and the first bit block includes a positive integer number of bit(s).

In one embodiment, the above UE for power adjustment further includes:

a first receiver, to receive R first signaling(s).

Herein, the R first signaling(s) is(are) used for determining R first offset(s) respectively, the first reference power is in linear correlation with a summation of the R first offset(s), and the R is a positive integer;

In one embodiment, the above UE for power adjustment further includes:

a first receiver, to receive R first signaling(s) and a second radio signal.

Herein, the R first signaling(s) is(are) used for determining R first offset(s) respectively, the first reference power is in linear correlation with a summation of the R first offset(s), and the R is a positive integer; a target first signaling is a latest first signaling among the R first signaling(s), the target first signaling includes scheduling information of the second radio signal, and the scheduling information includes at least one of occupied time domain resources, occupied frequency domain resources, an MCS, an HARQ process number, an RV and an NDI.

In one embodiment, the above UE for power adjustment is characterized in that: the first receiver further receives downlink information, wherein the downlink information is used for determining the T time unit(s).

In one embodiment, the above UE for power adjustment is characterized in that: the first receiver further receives downlink information, wherein the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the above UE for power adjustment is characterized in that: the first receiver further receives downlink information, wherein the downlink information is used for determining the T time unit(s), and the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the above UE for power adjustment is characterized in that: the first receiver further receives a second signaling, wherein the second signaling is used for triggering transmission of the first radio signal.

In one embodiment, the above UE for power adjustment is characterized in that: the R first signaling(s each) include(s) a first field, and the first field in each of the R first signaling(s) has a value equal to a first index; and the first index is an integer.

The disclosure provides a base station for power adjustment, wherein the base station includes:

a second receiver, to receive a first radio signal.

Herein, the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, the above base station for power adjustment is characterized in that: the first component is equal to a base-10 logarithm of the T.

In one embodiment, the above base station for power adjustment is characterized in that: the first reference power is in linear correlation with a base-10 logarithm of T1, and the T1 is a positive integer;

In one embodiment, the above base station for power adjustment is characterized in that: the first radio signal includes T sub-signal(s), the T sub-signal(s) is(are) transmitted on the T time unit(s) respectively, each of the T sub-signal(s) carries a first bit block, and the first bit block includes a positive integer number of bit(s).

In one embodiment, the above base station for power adjustment further includes:

a second transmitter, to transmit R first signaling(s).

Herein, the R first signaling(s) is(are) used for determining R first offset(s) respectively, the first reference power is in linear correlation with a summation of the R first offset(s), and the R is a positive integer.

In one embodiment, the above base station for power adjustment further includes:

a second transmitter, to transmit R first signaling(s) and a second radio signal.

Herein, the R first signaling(s) is(are) used for determining R first offset(s) respectively, the first reference power is in linear correlation with a summation of the R first offset(s), and the R is a positive integer; a target first signaling is a latest first signaling among the R first signaling(s), the target first signaling includes scheduling information of the second radio signal, and the scheduling information includes at least one of occupied time domain resources, occupied frequency domain resources, an MCS, a HARQ process number, an RV and an NDI.

In one embodiment, the above base station for power adjustment is characterized in that: the second transmitter further transmits downlink information, wherein the downlink information is used for determining the T time unit(s).

In one embodiment, the above base station for power adjustment is characterized in that: the second transmitter further transmits downlink information, wherein the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the above base station for power adjustment is characterized in that: the second transmitter further transmits downlink information, wherein the downlink information is used for determining the T time unit(s), and the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the above base station for power adjustment is characterized in that: the second transmitter further transmits a second signaling, wherein the second signaling is used for triggering transmission of the first radio signal.

In one embodiment, the above base station for power adjustment is characterized in that: the R first signaling(s each) include(s) a first field, and the first field in each of the R first signaling(s) has a value equal to a first index. The first index is an integer.

In one embodiment, compared with conventional schemes, the disclosure has the following advantages.

By introducing into a calculation formula of uplink power of a PUCCH a component which is correlated with a number of symbols occupied by the PUCCH in one slot, a transmit power of the PUCCH can be adjusted according to the number of symbols occupied by the PUCCH, thereby keeping a stable PUCCH coverage in the case of different numbers of symbols.

Frequency domain resource/code domain resource configuration, modulation coding and resource mapping mode of a PUCCH are enabled to flexibly extend to different numbers of symbols, which keeps the flexibility of design of the PUCCH.

BRIEF DESCRIPTION OF THE DRAWINGS

Other features, purposes and advantages of the disclosure will become more apparent from the detailed description of non-restrictive embodiments taken in conjunction with the following drawings.

DESCRIPTION OF THE EMBODIMENTS

Embodiment 1

Figure 1:
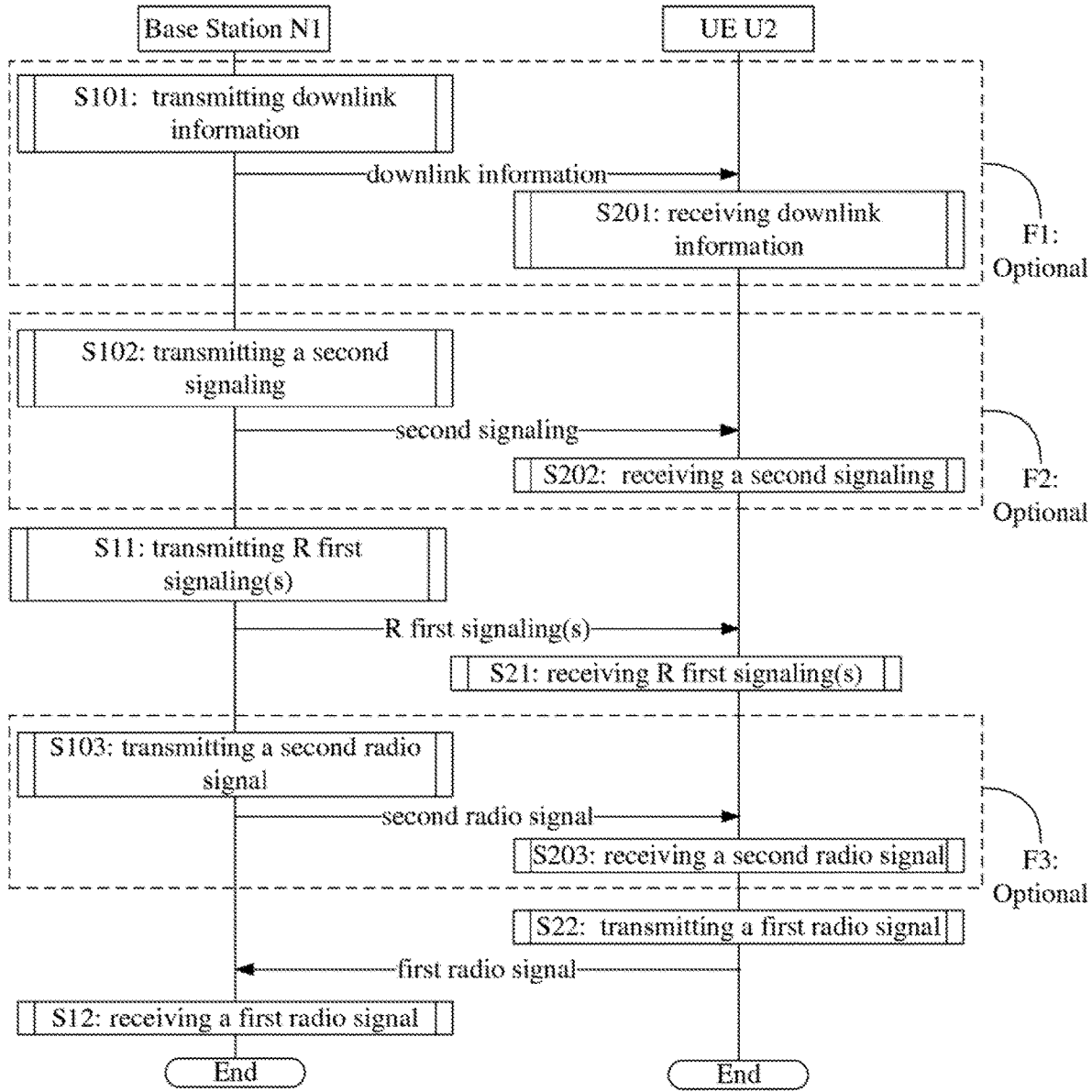
FIG. 1 is a flowchart of wireless transmission according to one embodiment of the disclosure.

Embodiment 1 illustrates an example of a flowchart of wireless transmission, as shown in FIG. 1. In FIG. 1, a base station N1 is a maintenance base station for a serving cell of a UE U2. In FIG. 1, steps in boxes F1, F2 and F3 are optional.

The N1 transmits downlink information in S101, transmits a second signaling in S102, transmits R first signaling(s) in S11, transmits a second radio signal in S103, and receives a first radio signal in S12.

The U2 receives downlink information in S201, receives a second signaling in S202, receives R first signaling(s) in S21, receives a second radio signal in S203, and transmits a first radio signal in S22.

In Embodiment 1, the first radio signal occupies T time unit(s) in time domain, and the T is used by the U2 to determine a first component. A first reference power is in linear correlation with the first component. A transmit power of the first radio signal is a first power, and the first reference power is used by the U2 to determine the first power. The T is a positive integer. The R first signaling(s) is(are) used by the U2 to determine R first offset(s) respectively, the first reference power is in linear correlation with a summation of the R first offset(s), and the R is a positive integer. A target first signaling is a latest first signaling among the R first signaling(s), the target first signaling includes scheduling information of the second radio signal, and the scheduling information of the second radio signal includes at least one of occupied time domain resources, occupied frequency domain resources, an MCS, a HARQ process number, an RV or an NDI. The downlink information is used by the U2 to determine the T time unit(s); or the downlink information is used by the U2 to determine configuration information of the first radio signal, the configuration information of the first radio signal includes at least one of occupied time domain resources, occupied frequency domain resources, occupied code domain resources, a cyclic shift, an OCC, a PUCCH format or a UCI content. The second signaling is used for triggering transmission of the first radio signal.

In one subembodiment, any one of the T time unit(s) is a duration of one wideband symbol.

In one subembodiment, the wideband symbol is an OFDM symbol.

In one subembodiment, the wideband symbol is a DFT-S-OFDM symbol.

In one subembodiment, the wideband symbol is an FBMC symbol.

In one embodiment, a number of subcarriers occupied by the first radio signal in frequency domain is unrelated to the T.

In one subembodiment, frequency domain resources occupied by the first radio signal in frequency domain and time domain resources occupied by the first radio signal in time domain are configured independently.

In one embodiment, the T is an integer not less than 4.

In one embodiment, the T is an integer not greater than 14.

In one embodiment, the T is an integer not greater than 14 but not less than 4.

In one embodiment, the T time unit(s) is(are) consecutive in time domain.

In one embodiment, the first radio signal includes a UCI.

In one subembodiment, the UCI includes at least one of a HARQ-ACK, a CSI, an SR or a CRI.

In one embodiment, the first radio signal is transmitted on an uplink physical layer control channel (that is, an uplink physical layer channel that cannot be used to transmit physical layer data).

In one subembodiment, the first radio signal is transmitted on a PUCCH.

In one subembodiment, the first radio signal is transmitted on a sPUCCH.

In one subembodiment, the first radio signal is transmitted on an NR-PUCCH.

In one embodiment, the first reference power is in unit of dBm.

In one embodiment, the first power is in unit of dBm.

In one embodiment, the first power is $P_{PUCCH}(i)$ the $P_{PUCCH}(i)$ is a transmit power on a PUCCH in the ith subframe in a serving cell with an index of c, and the first radio signal is transmitted in the serving cell with an index of c. Specific definitions of the $P_{PUCCH}(i)$ can refer to TS36.213.

In one embodiment, the first power is equal to a minimum one among the first reference power and a second power.

In one embodiment, the second power is a fixed constant.

In one embodiment, the second power is determined through a higher-layer signaling.

In one embodiment, the second power is $P_{CMAX,c}(i)$, the $P_{CMAX,c}(i)$ is a transmit power highest-threshold configured by the UE in the ith subframe in a serving cell with an index of c, and the first radio signal is transmitted in the serving cell with an index of c. Specific definitions of the $P_{CMAX,c}(i)$ can refer to TS36.213.

In one embodiment, the R first signaling(s) schedule(s) one same carrier.

In one embodiment, the R first signaling(s) is(are) physical layer signaling(s) respectively.

In one embodiment, the R first signaling(s) is(are) dynamic signaling(s) respectively.

In one embodiment, the R first signaling(s) is(are) dynamic signaling(s) for downlink grant respectively.

In one embodiment, the R first signaling(s) indicate(s) R first offset(s) respectively.

In one embodiment, the R first signaling(s) is(are) transmitted on downlink physical layer control channel(s) (that is, downlink channel(s) capable of carrying physical layer signaling(s) only) respectively.

In one subembodiment, the downlink physical layer control channel is a PDCCH.

In one subembodiment, the downlink physical layer control channel is a sPDCCH.

In one subembodiment, the downlink physical layer control channel is an NR-PDCCH.

In one embodiment, the R first offset(s) is(are) indicated by TPC(s) respectively.

In one embodiment, a linear coefficient between the first reference power and a summation of the R first offset(s) is 1.

In one embodiment, the second radio signal is transmitted on a downlink physical layer data channel (that is, a downlink channel capable of carrying physical layer data).

In one subembodiment, the second radio signal is transmitted on a PDSCH.

In one embodiment, the first component is equal to a base-10 logarithm of the T.

In one subembodiment, a linear coefficient between the first reference power and the first component is −10, that is, a linear coefficient between the first reference power and the (10*the first component) is −1.

In one embodiment, the first reference power is in linear correlation with a base-10 logarithm of T1, and the T1 is a positive integer.

In one subembodiment, a linear coefficient between the first reference power and a base-10 logarithm of T1 is 10.

In one subembodiment, the T1 is fixed.

In one subembodiment, the T1 is configured through a higher-layer signaling.

In one subembodiment, the T1 is semi-static.

In one subembodiment, the T1 is cell specific.

In one subembodiment, the T1 is UE specific.

In one subembodiment, the T1 is equal to 1.

In one subembodiment, the T1 is equal to 4.

In one subembodiment, the T1 is equal to 14.

In one embodiment, the first radio signal includes T sub-signal(s), the T sub-signal(s) is(are) transmitted on the T time unit(s) respectively, each of the T sub-signal(s) carries a first bit block, and the first bit block includes a positive integer number of bit(s).

In one subembodiment, the T sub-signal(s) is(are) transmitted by a same antenna port group, and the antenna port group includes a positive integer number of antenna ports.

In one subembodiment, the antenna port is formed by multiple antennas through antenna virtualization superposition, and mapping coefficients from the multiple antennas to the antenna port constitute a beamforming vector.

In one embodiment, the second signaling is a higher-layer signaling.

In one embodiment, the second signaling is a MAC CE signaling.

In one embodiment, the second signaling is a physical layer signaling.

In one embodiment, the second signaling is a dynamic signaling.

In one embodiment, the R first signaling(s each) include(s) a first field, and the first field in each of the R first signaling(s) has a value equal to a first index. The first index is an integer.

In one subembodiment, the first field includes 2 bits.

In one subembodiment, the first field includes 3 bits.

In one subembodiment, the first field includes 4 bits.

In one subembodiment, the first field includes 5 bits.

In one subembodiment, the first field includes 6 bits.

In one embodiment, the first index is a non-negative integer.

In one embodiment, box F1, box F2 and box F3 shown in FIG. 1 all exist. The downlink information is used by the U2 to determine configuration information of the first radio signal, the configuration information of the first radio signal includes at least one of occupied time domain resources, occupied frequency domain resources, occupied code domain resources, a cyclic shift, an OCC, a PUCCH format or a UCI content. The second signaling is used for triggering transmission of the first radio signal.

In one subembodiment, the first radio signal includes a semi-persistent CSI.

In one subembodiment, the first radio signal includes an aperiodic CSI.

In one subembodiment, the downlink information is used for determining M piece(s) of configuration information, and the configuration information of the first radio signal is one of the M piece(s) of configuration information. The M is a positive integer.

In one subembodiment, the target first signaling indicates an index of the configuration information of the first radio signal in the M piece(s) of configuration information.

In one subembodiment, the second signaling indicates an index of the configuration information of the first radio signal in the M piece(s) of configuration information.

In one subembodiment, the second signaling is further used by the U2 to determine partial configuration information of the first radio signal.

In one subembodiment, the second signaling indicates the partial configuration information of the first radio signal.

In one subembodiment, the downlink information is carried by a higher-layer signaling.

In one subembodiment, the downlink information is carried by an RRC signaling.

In one subembodiment, the downlink information is UE specific.

In one embodiment, box F1 and box F2 shown in FIG. 1 exist, while box F3 does not exist.

In one embodiment, box F1 shown in FIG. 1 exists, while box F2 and box F3 do not exist. The downlink information is used by the U2 to determine configuration information of the first radio signal, and the configuration information of the first radio signal includes at least one of occupied time domain resources, occupied frequency domain resources, occupied code domain resources, a cyclic shift, an OCC, a PUCCH format or a UCI content In one subembodiment, the downlink information indicates the configuration information of the first radio signal.

In one subembodiment, the first radio signal includes a periodic CSI.

In one subembodiment, the downlink information is carried by a higher-layer signaling.

In one subembodiment, the downlink information is carried by an RRC signaling.

In one subembodiment, the downlink information is UE specific.

In one embodiment, box F1 and box F3 shown in FIG. 1 exist, while box F2 does not exist. The downlink information is used by the U2 to determine a transmission direction of a target time resource pool, the transmission direction is one in a candidate direction set, the candidate direction set includes uplink or downlink, and the T time unit(s) belong(s) to time unit(s) in the target time resource pool corresponding to the uplink transmission direction; the target time resource pool includes a positive integer number of time unit(s). The target first signaling is used by the U2 to determine configuration information of the first radio signal, and the configuration information of the first radio signal includes at least one of occupied time domain resources, occupied frequency domain resources, occupied code domain resources, a cyclic shift, an OCC, a PUCCH format or a UCI content.

In one subembodiment, the first radio signal includes a HARQ-ACK.

In one subembodiment, the candidate direction set further includes sidelink.

In one subembodiment, the target time resource pool includes a positive integer number of consecutive time unit(s).

In one subembodiment, the target time resource pool is one slot.

In one subembodiment, the target time resource pool is 1 ms.

In one subembodiment, the target time resource pool is one subframe.

In one embodiment, all time units in the target time resource pool corresponding to the uplink transmission direction constitute an uplink time unit set, and the T time unit(s) belong(s) to the uplink time unit set.

In one subembodiment, a number of time units included in the uplink time unit set is equal to the T.

In one subembodiment, a number of time units included in the uplink time unit set is greater than the T.

In one subembodiment, the downlink information indicates the T.

In one subembodiment, the downlink information indicates positions of the T time unit(s) in the uplink time unit set.

In one subembodiment, all time units in the target time resource pool correspond to a same transmission direction.

In one embodiment, at least two time units in the target time resource pool correspond to different transmission directions.

In one subembodiment, the target first signaling indicates implicitly configuration information of the first radio signal.

In one subembodiment, the target first signaling indicates explicitly configuration information of the first radio signal.

In one subembodiment, the target first signaling indicates explicitly one part of the configuration information of the first radio signal, and the target first signaling indicates implicitly the other part of the configuration information of the first radio signal.

In one subembodiment, the downlink information is carried by a higher-layer signaling.

In one subembodiment, the downlink information is carried by an RRC signaling.

In one subembodiment, the downlink information is cell specific.

In one embodiment, box F1 shown in FIG. 1 does not exist, while box F2 and F3 exist.

In one embodiment, box F1 and box F2 shown in FIG. 1 do not exist, while box F3 exists.

In one embodiment, box F1 and box F3 shown in FIG. 1 do not exist, while box F2 exists.

In one embodiment, none of box F1, box F2 and box F3 shown in FIG. 1 exist.

Embodiment 2

Figure 2:
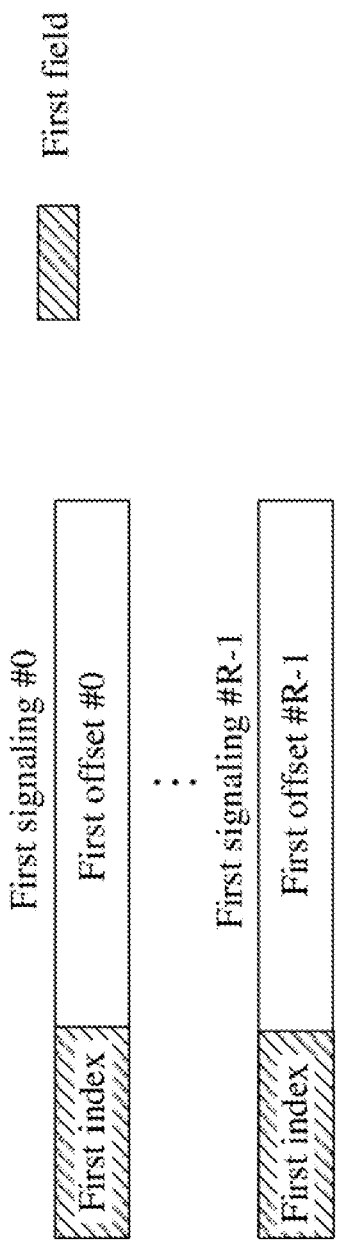
FIG. 2 is a diagram illustrating components constituting a first power according to one embodiment of the disclosure.

Embodiment 2 illustrates an example of a diagram of components constituting a first power, as shown in FIG. 2.

In Embodiment 2, the R first signalings in the disclosure are used for determining R first offsets respectively, the R first signalings each include a first field, and the first field in each of the R first signalings has a value equal to a first index. The first index is an integer. The first power is a minimum one among a second power and a first reference power, the first reference power is in linear correlation with a reference component, a first component, a second component, a third component, a fourth component, a fifth component, a sixth component or a seventh component respectively. A linear coefficient between the first reference power and the reference component is 10, a linear coefficient between the first reference power and the first component is −10, and linear coefficients between the first reference power and the second component, the third component, the fourth component, the fifth component, the sixth component or the seventh component are 1 respectively. The first radio signal in the disclosure occupies T time unit(s) in time domain, the first component is equal to a base-10 logarithm of the T, the reference component is equal to a base-10 logarithm of T1, the T1 is a positive integer and the T is a positive integer. The fifth component is in linear correlation with a summation of the R first offsets, and a linear coefficient between the fifth component and the summation of the R first offsets is 1. That is:

$$P_{PUCCH}(i) = \min \begin{Bmatrix} P_{CMAX,c}(i), \\ 10\log_{10}(T1) - 10\log_{10}(T) + P_{0\_PUCCH} + PL_c + h(n_{CQI}, n_{HARQ}, n_{SR}) \\ + \Delta_{F\_PUCCH}(F) + \Delta_{TxD}(F') + g(i) \end{Bmatrix} \quad [dBm]$$

where $P_{PUCCH}(i)$, $P_{CMAX,c}(i)$, $\log_{10}(T1)$, $\log_{10}(T)$, $P_{0\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ represent the first power, the second power, the reference component, the first component, the second component, the third component, the sixth component, the fourth component, the seventh component and the fifth component respectively. Detailed definitions of the $P_{PUCCH}(i)$, the $P_{CMAX,c}(i)$, the $P_{0\_PUCCH}$, the $h(n_{CQI}, n_{HARQ}, n_{SR})$, the $\Delta_{F\_PUCCH}(F)$, the $\Delta_{TxD}(F')$ and the $g(i)$ can refer to TS36.213. The $PL_c$ is equal to a transmit power of a given reference signal minus an RSRP of the given reference signal. A transmitter of the given reference signal is a target receiver of the first radio signal, and a receiver of the given reference signal is the UE.

In one embodiment, a PUCCH format corresponding to the first radio signal belongs to 1, 1a, 1b, 2, 2a, 2b or 3.

In one embodiment, the summation of the R first offsets is equal to the g(i).

In one embodiment, an absolute value of the linear coefficient between the first reference power and the reference component is equal to an absolute value of the linear coefficient between the first reference power and the first component.

In one embodiment, the linear coefficient between the first reference power and the reference component is equal to −1 multiplied by the linear coefficient between the first reference power and the first component.

In one embodiment, the T1 is fixed.

In one embodiment, the T1 is configured through a higher-layer signaling.

In one embodiment, the T1 is semi-static.

In one embodiment, the T1 is cell specific.

In one embodiment, the T1 is UE specific.

In one embodiment, the T1 is a positive integer not greater than 14.

In one embodiment, the T1 is equal to 1.

In one embodiment, the T1 is equal to 4.

In one embodiment, the T1 is equal to 14.

In one embodiment, the first index is an index of a target beamforming vector in Q1 beamforming vectors. The target beamforming vector is used for transmitting the first radio signal; or the target beamforming vector is used for receiving the first radio signal. The Q1 is a positive integer greater than 1.

In one subembodiment, the target beamforming vector is used for transmitting the given reference signal; or the target beamforming vector is used for receiving the given reference signal.

In one embodiment, the first index is an index of a target beamforming vector group in Q2 beamforming vector groups, and any one of the Q2 beamforming vector groups includes a positive integer number of beamforming vector(s). A target beamforming vector is used for transmitting the first radio signal; or a target beamforming vector is used for receiving the first radio signal. The target beamforming vector belongs to the target beamforming vector group. The Q2 is a positive integer greater than 1.

In one subembodiment, the target beamforming vector is used for transmitting the given reference signal; or the target beamforming vector is used for receiving the given reference signal.

In one embodiment, the first index is an index of a target vector pair in Q3 vector pairs, any one of the Q3 vector pairs includes two vectors, and the target vector pair includes a target transmitting beamforming vector or a target receiving beamforming vector. The target transmitting beamforming vector is used for transmitting the first radio signal, and the target receiving beamforming vector is used for receiving the first radio signal. The Q3 is a positive integer greater than 1.

In one subembodiment, the target transmitting beamforming vector is used for transmitting the given reference signal; or the target receiving beamforming vector is used for receiving the given reference signal.

In one embodiment, the first index is an index of a target antenna group in Q4 antenna groups, and any one of the Q4 antenna groups includes a positive integer number of antennas. The target antenna group is used for transmitting the first radio signal; or the target antenna group is used for receiving the first radio signal. The Q4 is a positive integer greater than 1.

In one subembodiment, the target antenna group is used for transmitting the given reference signal; or the target antenna group is used for receiving the given reference signal.

In one embodiment, the first index is an index of a target layer in Q5 layers. The first radio signal is transmitted on the target layer; or the first radio signal is received on the target layer. The Q5 is a positive integer greater than 1.

In one embodiment, the first index is an index of a target layer group in Q6 layer groups. Any one of the Q6 layer groups includes a positive integer number of layer(s). The first radio signal is transmitted on a target layer; or the first radio signal is received on the target layer. The target layer belongs to the target layer group. The Q6 is a positive integer greater than 1.

In one embodiment, the first index indicates a waveform of the first radio signal. The waveform is one of CP-OFDM or DFT-s-OFDM.

In one subembodiment, the waveform of the reference signal is the same as the waveform of the first radio signal.

Embodiment 3

Figure 3:
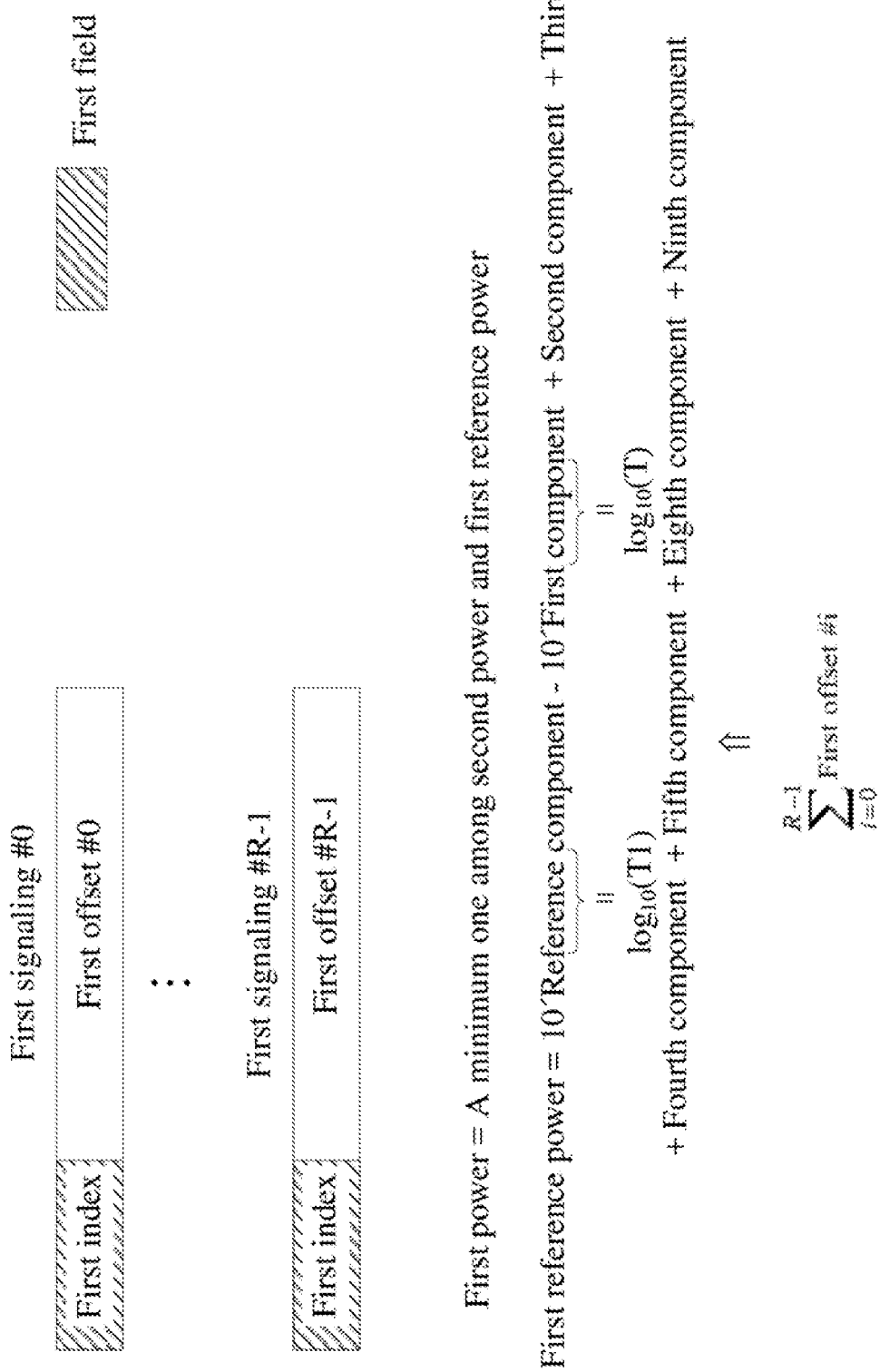
FIG. 3 is a diagram illustrating components constituting a first power according to another embodiment of the disclosure.

Embodiment 3 illustrates an example of a diagram of components constituting a first power, as shown in FIG. 3.

In Embodiment 3, the R first signalings in the disclosure are used for determining R first offsets respectively, the R first signalings each include a first field, and the first field in each of the R first signalings has a value equal to a first index. The first index is an integer. The first power is a minimum one among a second power and a first reference power, the first reference power is in linear correlation with a reference component, a first component, a second component, a third component, a fourth component, a fifth component, an eighth component or a ninth component respectively. A linear coefficient between the first reference power and the reference component is 10, a linear coefficient between the first reference power and the first component is −10, and linear coefficients between the first reference power and the second component, the third component, the fourth component, the fifth component, the eighth component or the ninth component are 1 respectively. The first radio signal in the disclosure occupies T time unit(s) in time domain, the first component is equal to a base-10 logarithm of the T, the reference component is equal to a base-10 logarithm of T1, the T1 is a positive integer and the T is a positive integer. The fifth component is in linear correlation with a summation of the R first offsets, and a linear coefficient between the fifth component and the summation of the R first offsets is 1. That is:

$$P_{PUCCH}(i) = \min\begin{Bmatrix} P_{CMAX,c}(i), \\ 10\log_{10}(T1) - 10\log_{10}(T) + P_{0\_PUCCH} + PL_c + 10\log_{10}(M_{PUCCH,c}(i)) \\ + \Delta_{TF,c}(i) + \Delta_{F\_PUCCH}(F) + g(i) \end{Bmatrix} [dBm]$$

where $P_{PUCCH}(i)$, $P_{CMAX,c}(i)$, $\log_{10}(T1)$, $\log_{10}(T)$, $P_{0\_PUCCH}$, $PL_c$, $10 \log_{10}(M_{PUCCH,c}(i))$, $\Delta_{TF,c}(i)$, $\Delta_{F\_PUCCH}(F)$ and $g(i)$ represent the first power, the second power, the reference component, the first component, the second component, the third component, the eighth component, the ninth component, the fourth component and the fifth component respectively. Detailed definitions of the $P_{PUCCH}(i)$, the $P_{CMAX,c}(i)$, the $P_{0\_PUCCH}$, the $M_{PUCCH,c}(i)$, the $\Delta_{TF,c}(i)$, the $\Delta_{F\_PUCCH}(F)$ and the $g(i)$ can refer to TS36.213. The $PL_c$ is equal to a transmit power of a given reference signal minus an RSRP of the given reference signal. A transmitter of the given reference signal is a target receiver of the first radio signal, and a receiver of the given reference signal is the UE.

In one embodiment, a PUCCH format corresponding to the first radio signal belongs to 4 or 5.

Embodiment 4

Figure 4:
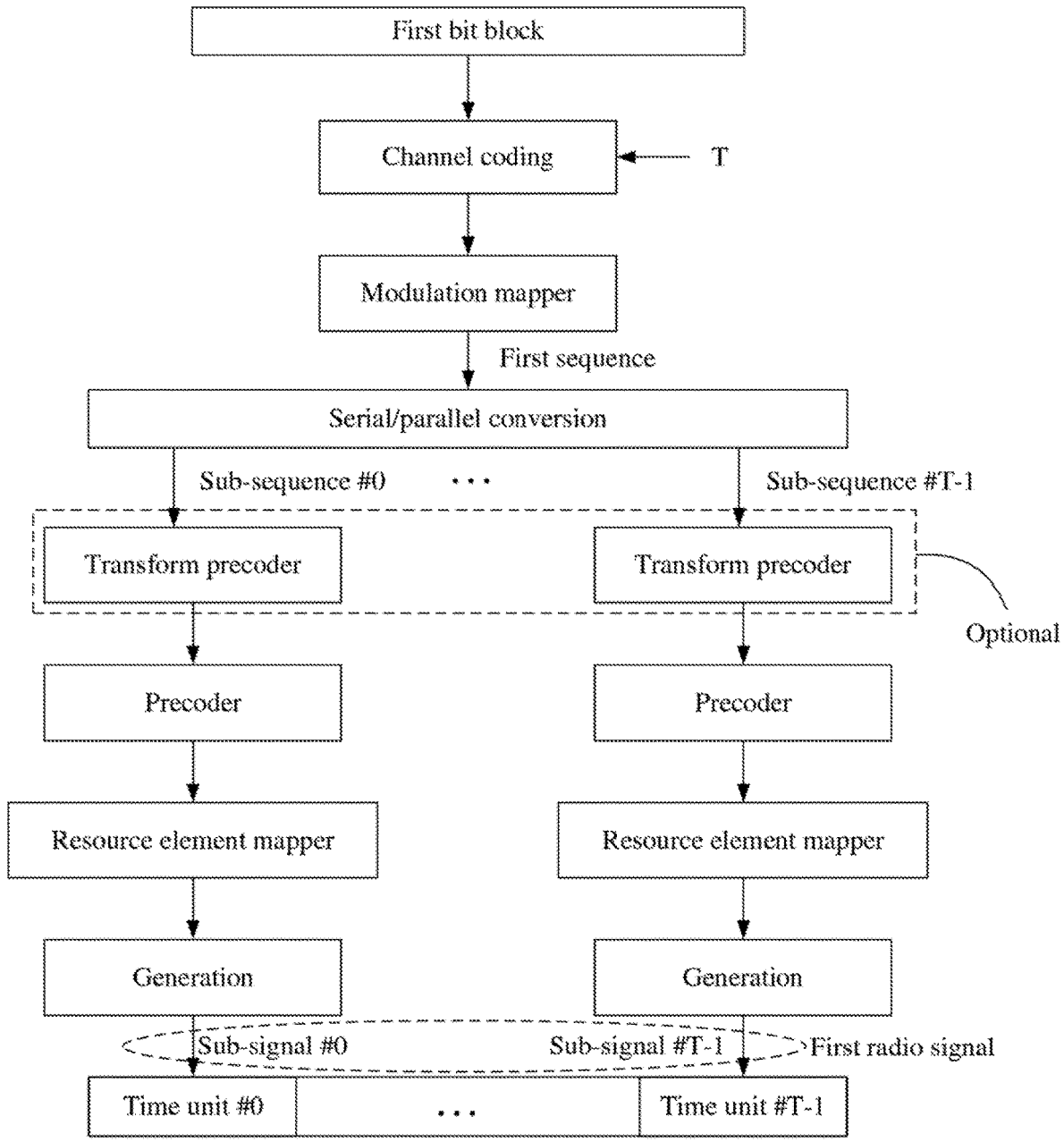
FIG. 4 is a diagram illustrating a relationship between a first radio signal, T sub-signals and a first bit block according to one embodiment of the disclosure.

Embodiment 4 illustrates an example of a diagram of a relationship between a first radio signal, T sub-signals and a first bit block, as shown in FIG. 4.

In Embodiment 4, the first radio signal occupies T time units in time domain, the first radio signal includes T sub-signals, the T sub-signals are transmitted on the T time units respectively, each of the T sub-signals carries a first bit block, and the first bit block includes a positive integer number of bit(s). In FIG. 4, the first bit block is processed in sequence through channel coding and a modulation mapper to generate a first sequence. The channel coding includes rate matching, and the T is used for determining a code rate of the channel coding. The first sequence is processed through a serial-parallel conversion to be converted into T sub-sequences. The T sub-sequences are one-to-one corresponding to the T sub-signals. Each of the T sub-signals is generated by an output obtained after a corresponding sub-sequence is processed in sequence through a transform precoder (optional), a precoder, a resource element processor, and generation of wideband symbols. The first sequence and the T sub-sequences include a positive integer number of symbol(s) respectively.

In one embodiment, a number of symbols included in any one of the T sub-sequences is unrelated to T.

In one embodiment, any two of the T sub-sequences include a same number of symbols.

In one embodiment, a number of symbols included in the first sequence increases linearly with T.

In one subembodiment, the number of symbols included in the first sequence is equal to the T multiplied by S, and the S is a number of symbols included in any one of the T sub-sequences. The S is a positive integer.

In one embodiment, a constellation corresponding to the modulation mapper is Quadrature Phase Shift Keying (QPSK), and a number of bits included in an output of the channel coding is equal to the T multiplied by S multiplied by 2.

In one embodiment, a waveform of the first radio signal is CP-OFDM, and each of the T sub-signals is generated by an output obtained after a corresponding sub-sequence is processed in sequence through a precoder, a resource element mapper and generation of wideband symbols.

In one embodiment, a waveform of the first radio signal is DFT-s-OFDM, and each of the T sub-signals is formed by and corresponding to an output obtained after a corresponding sub-sequence is processed in sequence through a transform precoder, a precoder, a resource element mapper and generation of wideband symbols.

Embodiment 5

Figure 5:
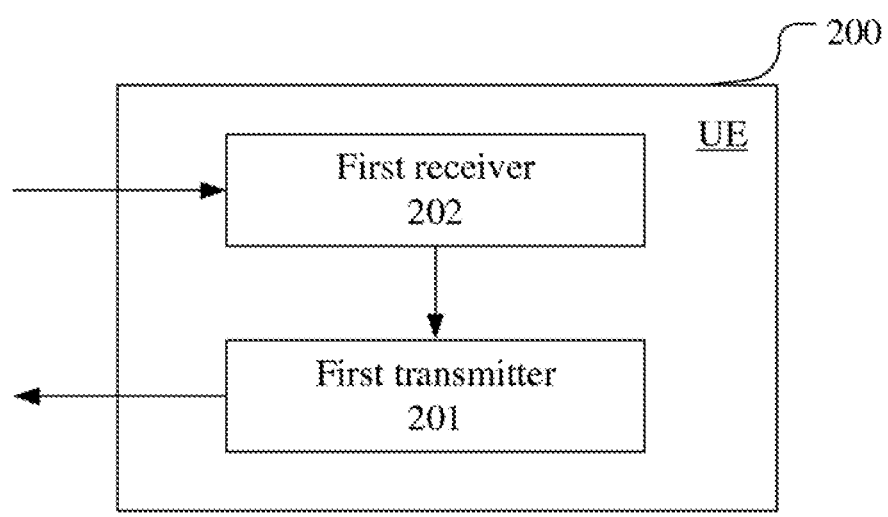
FIG. 5 is a structure block diagram illustrating a processing device in a UE according to one embodiment of the disclosure.

Embodiment 5 illustrates a structure block diagram of a processing device in a UE, as shown in FIG. 5.

In FIG. 5, the processing device 200 in the UE is mainly composed of a first transmitter 201 and a first receiver 202.

The first transmitter 201 transmits a first radio signal; and the first receiver 202 receives at least the former one of R first signaling(s) or a second radio signal.

In Embodiment 5, the first radio signal occupies T time unit(s) in time domain, and the T is used by the first transmitter 201 to determine a first component. A first reference power is in linear correlation with the first component. A transmit power of the first radio signal is a first power, and the first reference power is used by the first transmitter 201 to determine the first power. The T is a positive integer. The R first signaling(s) is(are) used by the first transmitter 201 to determine R first offset(s) respectively, the first reference power is in linear correlation with a summation of the R first offset(s), and the R is a positive integer. A target first signaling is a latest first signaling among the R first signaling(s), the target first signaling includes scheduling information of the second radio signal, and the scheduling information of the second radio signal includes at least one of occupied time domain resources, occupied frequency domain resources, an MCS, an HARQ process number, an RV or an NDI.

In one embodiment, the first component is equal to a base-10 logarithm of the T.

In one embodiment, the first reference power is in linear correlation with a base-10 logarithm of T1, and the T1 is a positive integer.

In one embodiment, the first radio signal includes T sub-signal(s), the T sub-signal(s) is(are) transmitted on the T time unit(s) respectively, each of the T sub-signal(s) carries a first bit block, and the first bit block includes a positive integer number of bit(s).

In one embodiment, the first receiver 202 further receives downlink information, wherein the downlink information is used by the first transmitter 201 to determine the T time unit(s).

In one embodiment, the first receiver 202 further receives downlink information, wherein the downlink information is used by the first transmitter 201 to determine configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the first receiver 202 further receives downlink information, wherein the downlink information is used by the first transmitter 201 to determine the T time unit(s), and the downlink information is used by the first transmitter 201 to determine configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the first receiver 202 further receives a second signaling, wherein the second signaling is used for triggering transmission of the first radio signal.

In one embodiment, the R first signaling(s each) include(s) a first field, and the first field in each of the R first signaling(s) has a value equal to a first index. The first index is an integer.

Embodiment 6

Figure 6:
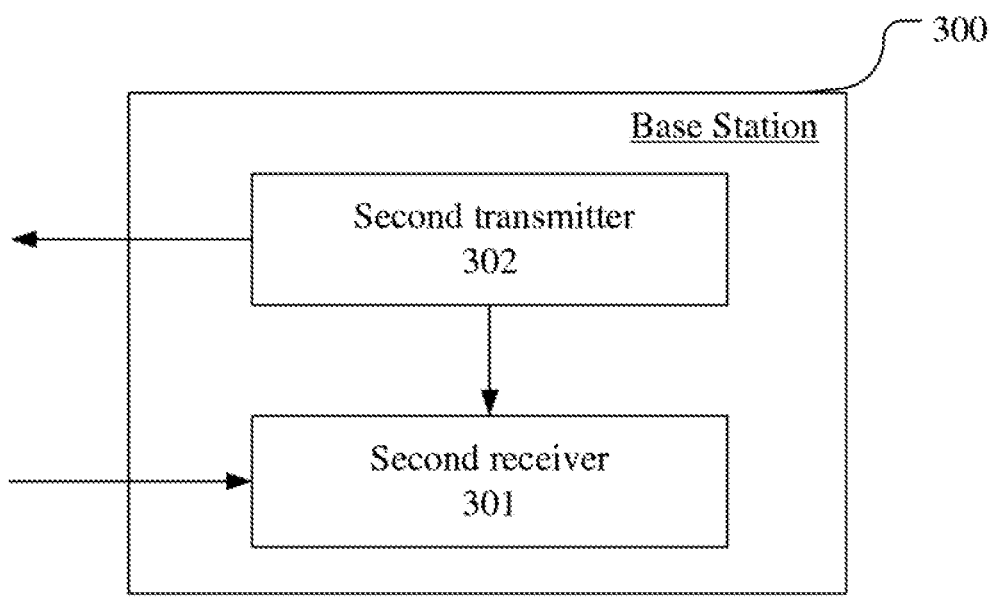
FIG. 6 is a structure block diagram illustrating a processing device in a base station according to one embodiment of the disclosure.

Embodiment 6 illustrates an example of a structure block diagram of a processing device in a base station, as shown in FIG. 6.

In FIG. 6, the processing device 300 in the base station is mainly composed of a second receiver 301 and a second transmitter 302.

The second receiver 301 receives a first radio signal; and the second transmitter 302 transmits at least the former one of R first signaling(s) and a second radio signal.

In Embodiment 6, the first radio signal occupies T time unit(s) in time domain, and the T is used for determining a first component. A first reference power is in linear correlation with the first component. A transmit power of the first radio signal is a first power, and the first reference power is used for determining the first power. The T is a positive integer. The R first signaling(s) is(are) used for determining R first offset(s) respectively, the first reference power is in linear correlation with a summation of the R first offset(s), and the R is a positive integer. A target first signaling is a latest first signaling among the R first signaling(s), the target first signaling includes scheduling information of the second radio signal, and the scheduling information of the second radio signal includes at least one of occupied time domain resources, occupied frequency domain resources, an MCS, a HARQ process number, an RV or an NDI.

In one embodiment, the first component is equal to a base-10 logarithm of the T.

In one embodiment, the first reference power is in linear correlation with a base-10 logarithm of T1, and the T1 is a positive integer.

In one embodiment, the first radio signal includes T sub-signal(s), the T sub-signal(s) is(are) transmitted on the T time unit(s) respectively, each of the T sub-signal(s) carries a first bit block, and the first bit block includes a positive integer number of bit(s).

In one embodiment, the second transmitter 302 further transmits downlink information, wherein the downlink information is used for determining the T time unit(s).

In one embodiment, the second transmitter 302 further transmits downlink information, wherein the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the second transmitter 302 further transmits downlink information, wherein the downlink information is used for determining the T time unit(s), and the downlink information is used for determining configuration information of the first radio signal, the configuration information of the first radio signal includes at least one of occupied time domain resources, occupied frequency domain resources, occupied code domain resources, a cyclic shift, an OCC, a PUCCH format or a UCI content.

In one embodiment, the second transmitter 302 further transmits a second signaling, wherein the second signaling is used for triggering transmission of the first radio signal.

In one embodiment, the R first signaling(s each) include(s) a first field, and the first field in each of the R first signaling(s) has a value equal to a first index. The first index is an integer.

Embodiment 7

Figure 7:
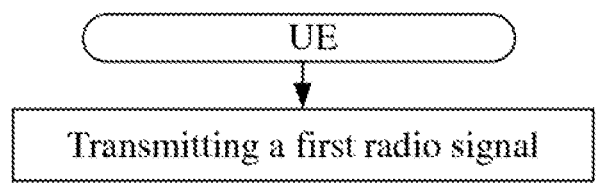
FIG. 7 is a flowchart of a first radio signal according to one embodiment of the disclosure.

Embodiment 7 illustrates a flowchart of a first radio signal, as shown in FIG. 7.

In Embodiment 7, the UE in the disclosure transmits a first radio signal, wherein the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, any one of the T time unit(s) is a duration of one wideband symbol.

In one embodiment, a number of subcarriers occupied by the first radio signal in frequency domain is unrelated to the T.

In one embodiment, frequency domain resources occupied by the first radio signal in frequency domain and time domain resources occupied by the first radio signal in time domain are configured independently.

In one embodiment, any one of the T time unit(s) is one slot.

In one embodiment, any one of the T time unit(s) is 1 ms.

In one embodiment, any one of the T time unit(s) is one subframe.

In one embodiment, the T is an integer not less than 4.

In one embodiment, the T is an integer not greater than 14.

In one embodiment, the T is an integer not greater than 14 but not less than 4.

In one embodiment, the first radio signal includes a UCI.

In one subembodiment, the UCI includes at least one of a HARQ-ACK, a CSI, an SR or a CRI.

In one embodiment, the first reference power is in unit of dBm.

In one embodiment, a linear coefficient between the first reference power and the first component is −1.

In one embodiment, a linear coefficient between the first reference power and the first component is −10, that is, a linear coefficient between the first reference power and the (10*the first component) is −1.

In one embodiment, the first power is in unit of dBm.

Embodiment 8

Figure 8:
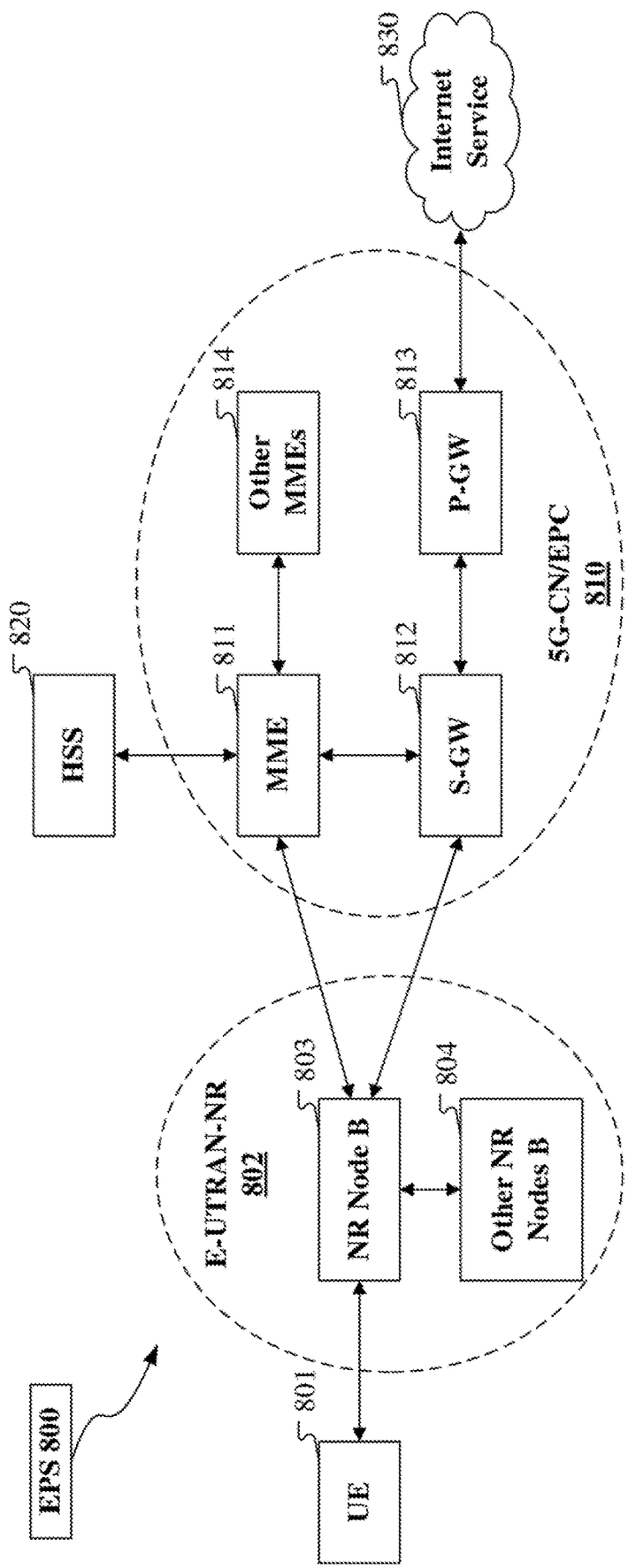
FIG. 8 is a diagram illustrating a network architecture according to one embodiment of the disclosure.

Embodiment 8 illustrates an example of a network architecture, as shown in FIG. 8.

FIG. 8 illustrates a network architecture 800 of Long-Term Evolution (LTE), Long-Term Evolution Advanced (LTE-A) and future 5G systems. The LTE network architecture 800 may be called an Evolved Packet System (EPS) 800. The EPS 800 may include one or more UEs 801, an Evolved UMTS Terrestrial Radio Access Network-New Radio (E-UTRAN-NR) 802, a 5G-Core Network/Evolved Packet Core (5G-CN/EPC) 810, a Home Subscriber Server (HSS) 820 and an Internet Service 830. Herein, the UMTS represents Universal Mobile Telecommunication System. The EPS may be interconnected with other access networks. For simple description, the entities/interfaces are not shown. As shown in FIG. 8, the EPS provides packet switching services. Those skilled in the art are easy to understand that various concepts presented throughout the present disclosure can be extended to networks providing circuit switching services. The E-UTRAN-NR includes an NR node B (gNB) 803 and other gNBs 804. The gNB 803 provides UE 801 oriented user plane and control plane protocol terminations. The gNB 803 may be connected to other gNBs 804 via an X2 interface (for example, backhaul). The gNB 803 may be called a base station, a base transceiver station, a radio base station, a radio transceiver, a transceiver function, a Basic Service Set (BSS), an Extended Service Set (ESS), a Transmitter Receiver Point (TRP) or other appropriate terms. The gNB 803 provides an access point of the 5G-CN/EPC 810 for the UE 801. Examples of UE 801 include cellular phones, smart phones, Session Initiation Protocol (SIP) phones, laptop computers, Personal Digital Assistants (PDAs), Satellite Radios, Global Positioning Systems (GPSs), multimedia devices, video devices, digital audio player (for example, MP3 players), cameras, games consoles, unmanned aerial vehicles, air vehicles, narrow-band physical network equipment, machine-type communication equipment, land vehicles, automobiles, wearable equipment, or any other devices having similar functions. Those skilled in the art also can call the UE 801 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a mobile client or other appropriate terms. The gNB 803 is connected to the 5G-CN/EPC 810 via an S1 interface. The 5G-CN/EPC 810 includes an MME 811, other MMES 814, a Service Gateway (S-GW) 812 and a Packet Data Network Gateway (P-GW) 813. The MME 811 is a control node for processing a signaling between the UE 801 and the 5G-CN/EPC 810. Generally, the MME 811 provides bearer and connection management. All user Internet Protocol (IP) packets are transmitted through the S-GW 812. The S-GW 812 is connected to the P-GW 813. The P-GW 813 provides UE IP address allocation and other functions. The P-GW 813 is connected to the Internet service 830. The Internet service 830 includes IP services corresponding to operators, specifically including Internet, Intranet, IP Multimedia Subsystems (IP IMSs) and Packet Switching Streaming Services (PSSs).

In one embodiment, the UE 801 corresponds to the UE in the disclosure.

In one embodiment, the gNB 803 corresponds to the base station in the disclosure.

Embodiment 9

Figure 9:
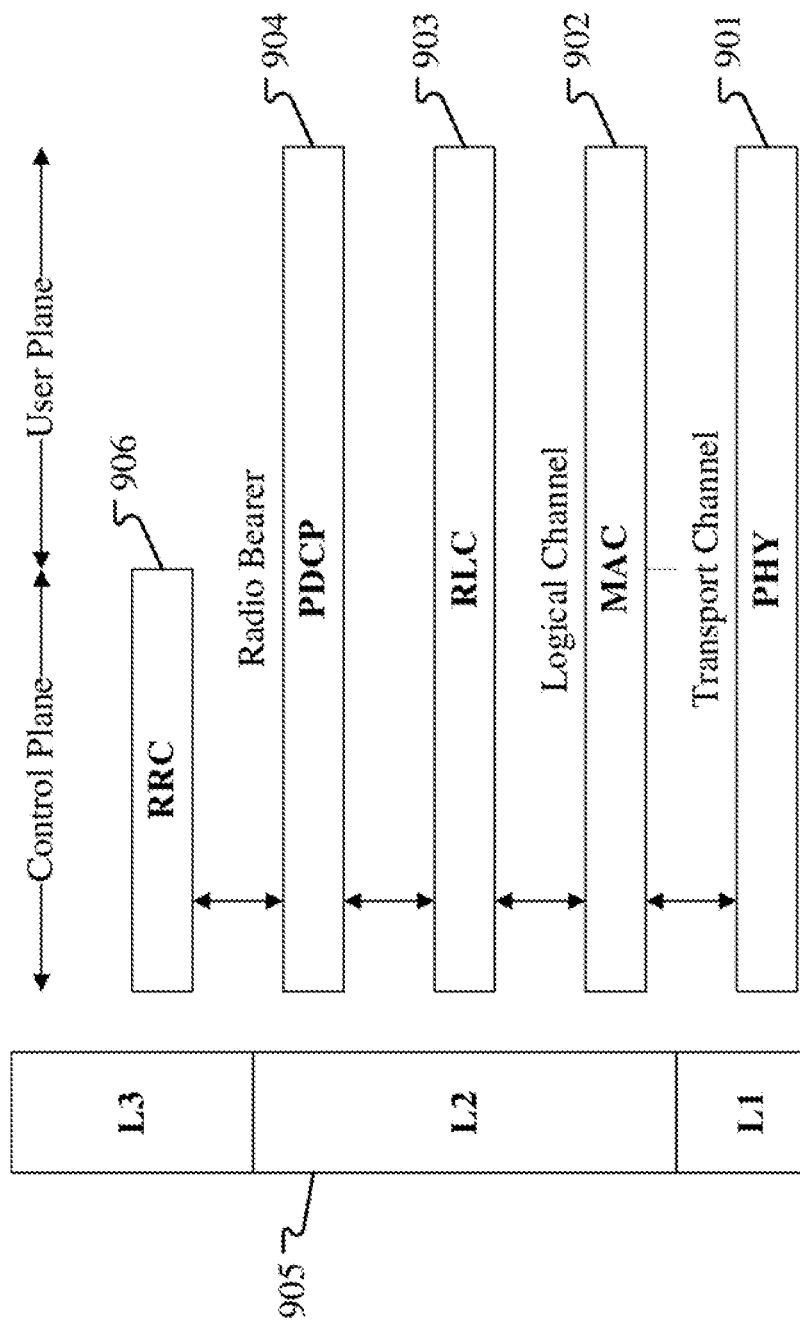
FIG. 9 is a diagram illustrating an embodiment of a radio protocol architecture of a user plane and a control plane according to one embodiment of the disclosure.

Embodiment 9 illustrates an example of a diagram of an embodiment of a radio protocol architecture of a user plane and a control plane, as shown in FIG. 9.

FIG. 9 is a diagram illustrating an embodiment of a radio protocol architecture of a user plane and a control plane. In FIG. 9, the radio protocol architecture of a UE and a gNB is represented by three layers, which are a Layer 1, a Layer 2 and a Layer 3 respectively. The Layer 1 (L1 layer) is the lowest layer and implements various PHY (physical layer) signal processing functions. The L1 layer will be referred to herein as the PHY 901. The Layer 2 (L2 layer) 905 is above the PHY 901, and is responsible for the link between the UE and the gNB over the PHY 901. In the user plane, the L2 layer 905 includes a Medium Access Control (MAC) sublayer 902, a Radio Link Control (RLC) sublayer 903, and a Packet Data Convergence Protocol (PDCP) sublayer 904, which are terminated at the gNB on the network side. Although not shown in FIG. 10, the UE may include several higher layers above the L2 layer 905, including a network layer (i.e. IP layer) terminated at the P-GW 813 on the network side and an application layer terminated at the other end (i.e. a peer UE, a server, etc.) of the connection. The PDCP sublayer 904 provides multiplexing between different radio bearers and logical channels. The PDCP sublayer 904 also provides header compression for higher-layer packets so as to reduce radio transmission overheads. The PDCP sublayer 904 provides security by encrypting packets and provides support for UE handover between gNBs. The RLC sublayer 903 provides segmentation and reassembling of higher-layer packets, retransmission of lost packets, and reordering of lost packets to as to compensate for out-of-order reception due to HARQ. The MAC sublayer 902 provides multiplexing between logical channels and transport channels. The MAC sublayer 902 is also responsible for allocating various radio resources (i.e., resource blocks) in one cell among UEs. The MAC sublayer 902 is also in charge of HARQ operations. In the control plane, the radio protocol architecture of the UE and the gNB is almost the same as the radio protocol architecture in the user plane on the PHY 901 and the L2 layer 905, with the exception that there is no header compression function for the control plane. The control plane also includes a Radio Resource Control (RRC) sublayer 906 in the layer 3 (L3). The RRC sublayer 906 is responsible for acquiring radio resources (i.e. radio bearers) and configuring lower layers using an RRC signaling between the gNB and the UE.

In one embodiment, the radio protocol architecture shown in FIG. 9 is applicable to the UE in the disclosure.

In one embodiment, the radio protocol architecture shown in FIG. 9 is applicable to the base station in the disclosure.

In one embodiment, the first radio signal in the disclosure is generated by the PHY 901.

In one embodiment, the R first signaling(s) in the disclosure is(are) generated by the PHY 901.

In one embodiment, the second radio signal in the disclosure is generated by the PHY 901.

In one embodiment, the downlink information in the disclosure is generated by the RRC sublayer 906.

In one embodiment, the downlink information in the disclosure is generated by the MAC sublayer 902.

In one embodiment, the downlink information in the disclosure is generated by the PHY 901.

In one embodiment, the second signaling in the disclosure is generated by the RRC sublayer 906.

In one embodiment, the second signaling in the disclosure is generated by the MAC sublayer 902.

In one embodiment, the second signaling in the disclosure is generated by the PHY 901.

Embodiment 10

Figure 10:
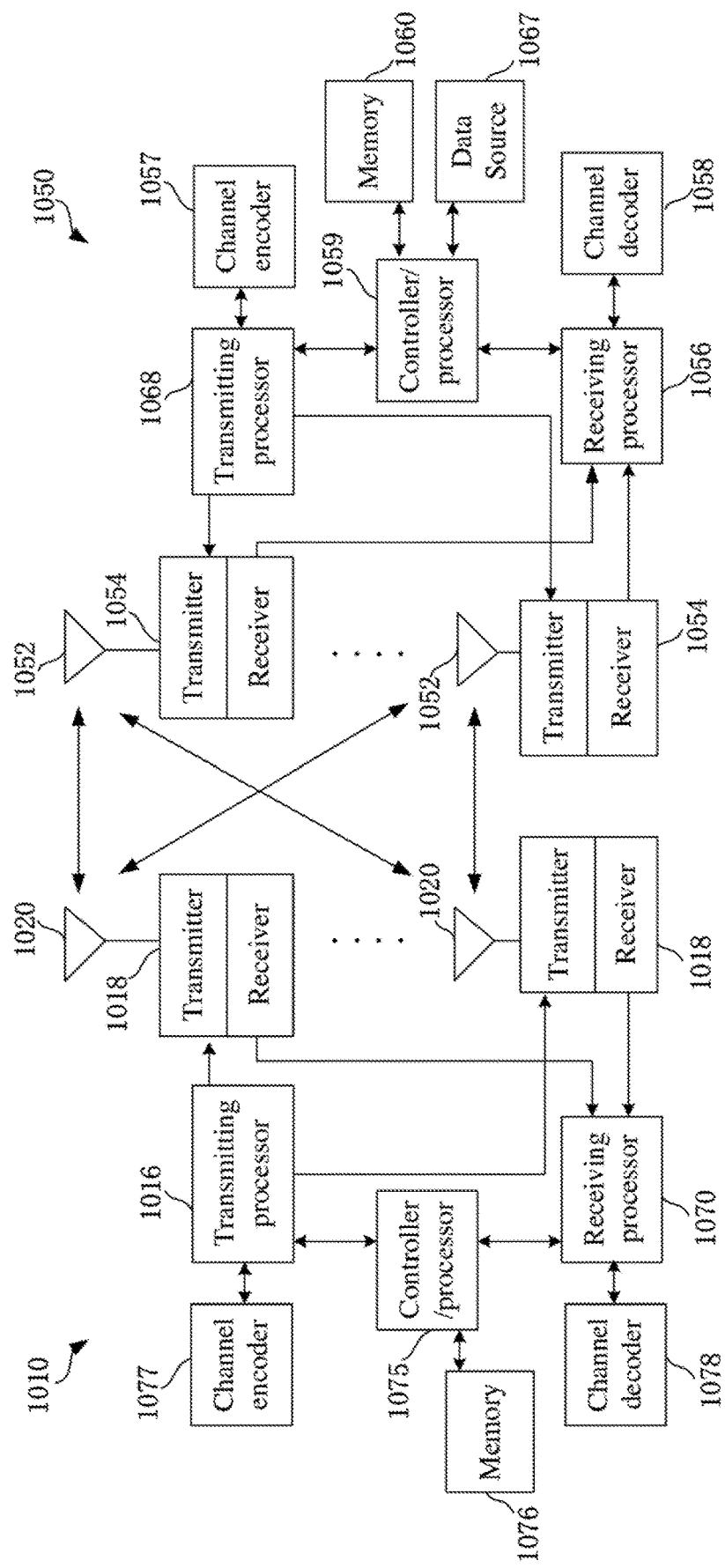
FIG. 10 is a diagram illustrating a New Radio (NR) node and a UE according to one embodiment of the disclosure.

Embodiment 10 illustrates an example of a diagram of an evolved node and a UE, as shown in FIG. 10. FIG. 10 is a block diagram of a UE 1050 and a gNB 1010 that are in communication with each other in an access network.

The gNB 1010 includes a controller/processor 1075, a memory 1076, a receiving processor 1070, a transmitting processor 1016, a channel encoder 1077, a channel decoder 1078, a transmitter/receiver 1018 and an antenna 1020.

The UE 1050 includes a controller/processor 1059, a memory 1060, a data source 1067, a transmitting processor 1068, a receiving processor 1056, a channel encoder 1057, a channel decoder 1058, a transmitter/receiver 1054 and an antenna 1052.

In downlink transmission, at the gNB, a higher-layer packet from a core network is provided to the controller/processor 1075. The controller/processor 1075 provides a function of Layer 2. In downlink transmission, the controller/processor 1075 provides header compression, encryption, packet segmentation and reordering, multiplexing between a logical channel and a transport channel, and a radio resource allocation for the UE 1050 based on various priorities. The controller/processor 1075 is also in charge of HARQ operation, retransmission of a lost packet, and a signaling to the UE 1050. The transmitting processor 1016 and the channel encoder 1077 perform various signal processing functions used for Layer 1 (that is, physical layer). The channel encoder 1077 performs encoding and interleaving so as to ensure a FEC (Forward Error Correction) at the UE 1050 side. The transmitting processor 1016 performs the mapping to signal clusters corresponding to different modulation schemes (i.e., BPSK, QPSK, M-PSK M-QAM, etc.), and processes the encoded and modulated symbols by a digital spatial precoding/beamforming operation to generate one or more spatial streams. The transmitting processor 1016 subsequently maps each spatial stream into subcarrier(s) to be multiplexed with reference signal(s) (i.e., pilot) in a time domain and/or frequency domain, and then processes it with Inverse Fast Fourier Transform (IFFT) to generate (a) physical channel(s) carrying a time-domain multicarrier symbol stream. Each transmitter 1018 converts a baseband multicarrier symbol stream into a radio frequency stream and then provides it to the corresponding antenna 1020.

In downlink transmission, at the UE 1050, each receiver 1054 receives a signal via the corresponding antenna 1052. Each receiver 1054 recovers the information modulated to the RF carrier and converts a radio frequency stream into a baseband multicarrier symbol stream to provide to the receiving processor 1056. The receiving processor 1056 and the channel decoder 1058 perform various signal processing functions of Layer 1. The receiving processor 1056 converts the baseband multicarrier symbol stream from a time domain into a frequency domain using FFT (Fast Fourier Transform). In a frequency domain, physical layer data signals and reference signals are demultiplexed by the receiving processor 1056, wherein the reference signals are used for channel estimation, and the physical layer data is subjected to multi-antenna detection in the receiving processor 1056 to recover any spatial stream targeting the UE 1050. Symbols on each spatial stream are demodulated and recovered in the receiving processor 1056 to generate a soft decision. Then, the channel decoder 1058 decodes and de-interleaves the soft decision to recover the higher-layer data and control signals on the physical channel transmitted by the gNB 1010. Next, the higher-layer data and control signals are provided to the controller/processor 1059. The controller/processor 1059 performs functions of Layer 2. The controller/processor 1059 can be connected to the memory 1060 that stores program codes and data. The memory 1060 may be called a computer readable media. In downlink transmission, the controller/processor 1059 provides multiplexing between the transport channel and the logical channel, packet reassembling, decryption, header decompression, and control signal processing so as to recover higher-layer packets coming from the core network. The higher-layer packets are then provided to all protocol layers above Layer 2, or various control signals can be provided to Layer 3 for processing. The controller/processor 1059 can also perform error detection using ACK and/or NACK protocols to support the HARQ operation.

In the uplink transmission, at the UE 1050, the data source 1067 provides a higher-layer packet to the controller/processor 1059. The data source 1067 illustrates all protocol layers above L2 layer. Similar as the transmitting function of the gNB 1010 described in downlink transmission, the controller/processor 1059 provides header compression, encryption, packet segmentation and reordering, and multiplexing between a logical channel and a transport channel based on the radio resource allocation of the base station 1010 so as to provide the functions of Layer 2 used for the control plane and user plane. The controller/processor 1059 is also in charge of HARQ operation, retransmission of a lost packet, and a signaling to the gNB 1010. The channel encoder 1057 performs channel encoding. The encoded data experiences a modulation and multi-antenna spatial precoding/beamforming processing performed by the transmitting processor 1068, to be modulated into one or more multicarrier/single-carrier symbol streams, which then is/are provided to the antenna 1052 via the transmitter 1054. Each transmitter 1052 first converts the baseband symbol stream provided by the transmitting processor 1068 into a radio frequency symbol stream and then provides the radio frequency symbol stream to the antenna 1052.

In uplink transmission, the function of the gNB 1010 is similar as the receiving function of the UE 1050 described in the downlink transmission. Each receiver 1018 receives a radio frequency signal via the corresponding antenna 1020, converts the received radio frequency signal into a baseband signal, and provides the baseband signal to the receiving processor 1070. The receiving processor 1070 and the channel decoder 1078 together provide functions of Layer 1. The controller/processor 1075 provides functions of Layer 2. The controller/processor 1075 may be connected to the memory 1076 that stores program codes and data. The memory 1076 may be called a computer readable media. In uplink transmission, the controller/processor 1075 provides de-multiplexing between the transport channel and the logical channel, packet reassembling, decryption, header decompression, and control signal processing so as to recover higher-layer packets coming from the UE 1050. The higher-layer packets, coming from the controller/processor 1075, may be provided to the core network. The controller/processor 1075 can also perform error detection using ACK and/or NACK protocols to support the HARQ operation.

In one embodiment, the UE 1050 includes at least one processor and at least one memory. The at least one memory includes computer program codes. The at least one memory and the computer program codes are configured to be used in collaboration with the at least one processor. The UE 1050 at least transmits the first radio signal in the disclosure, wherein the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, the UE 1050 includes a memory that stores a computer readable instruction program. The computer readable instruction program generates an action when executed by at least one processor. The action includes: transmitting the first radio signal in the disclosure, wherein the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one subembodiment, the gNB 1010 includes at least one processor and at least one memory. The at least one memory includes computer program codes. The at least one memory and the computer program codes are configured to be used in collaboration with the at least one processor. The gNB 1010 at least receives the first radio signal in the disclosure, wherein the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one subembodiment, the gNB 1010 includes a memory that stores a computer readable instruction program. The computer readable instruction program generates an action when executed by at least one processor. The action includes: receiving the first radio signal in the disclosure, wherein the first radio signal occupies T time unit(s) in time domain, and the T is used for determining a first component; a first reference power is in linear correlation with the first component; a transmit power of the first radio signal is a first power, and the first reference power is used for determining the first power; and the T is a positive integer.

In one embodiment, the gNB 1010 corresponds to the base station in the present disclosure.

In one embodiment, the UE 1050 corresponds to the UE in the present disclosure.

In one embodiment, at least one of the antenna 1020, the receiver 1018, the receiving processor 1070, the channel decoder 1078, the controller/processor 1075 or the memory 1076 is used for receiving the first radio signal in the disclosure; and at least one of the antenna 1052, the transmitter 1054, the transmitting processor 1068, the channel encoder 1057, the controller/processor 1059, the memory 1060 or the data source 1067 is used for transmitting the first radio signal in the disclosure.

In one embodiment, at least one of the antenna 1052, the receiver 1054, the receiving processor 1056, the channel decoder 1058, the controller/processor 1059, the memory 1060 or the data source 1067 is used for receiving the R first signaling(s) in the disclosure; and at least one of the antenna 1020, the transmitter 1018, the transmitting processor 1016, the channel encoder 1077, the controller/processor 1075 or the memory 1076 is used for transmitting the R first signaling(s) in the disclosure.

In one embodiment, at least one of the antenna 1052, the receiver 1054, the receiving processor 1056, the channel decoder 1058, the controller/processor 1059, the memory 1060 or the data source 1067 is used for receiving the second radio signal in the disclosure; and at least one of the antenna 1020, the transmitter 1018, the transmitting processor 1016, the channel encoder 1077, the controller/processor 1075 or the memory 1076 is used for transmitting the second radio signal in the disclosure.

In one embodiment, at least one of the antenna 1052, the receiver 1054, the receiving processor 1056, the channel decoder 1058, the controller/processor 1059, the memory 1060 or the data source 1067 is used for receiving the downlink information in the disclosure; and at least one of the antenna 1020, the transmitter 1018, the transmitting processor 1016, the channel encoder 1077, the controller/processor 1075 or the memory 1076 is used for transmitting the downlink information.

In one embodiment, at least one of the antenna 1052, the receiver 1054, the receiving processor 1056, the channel decoder 1058, the controller/processor 1059, the memory 1060 or the data source 1067 is used for receiving the second signaling in the disclosure; and at least one of the antenna 1020, the transmitter 1018, the transmitting processor 1016, the channel encoder 1077, the controller/processor 1075 or the memory 1076 is used for transmitting the second signaling in the disclosure.

In one embodiment, the first transmitter 201 mentioned in Embodiment 5 includes at least one of the antenna 1052, the transmitter 1054, the transmitting processor 1068, the channel encoder 1057, the controller/processor 1059, the memory 1060 or the data source 1067.

In one embodiment, the first receiver 202 mentioned in Embodiment 5 includes at least one of the antenna 1052, the receiver 1054, the receiving processor 1056, the channel decoder 1058, the controller/processor 1059, the memory 1060 or the data source 1067.

In one embodiment, the second receiver 301 mentioned in Embodiment 6 includes at least one of the antenna 1020, the receiver 1018, the receiving processor 1070, the channel decoder 1078, the controller/processor 1075 or the memory 1076.

In one embodiment, the second transmitter 302 mentioned in Embodiment 6 includes at least one of the antenna 1020, the transmitter 1018, the transmitting processor 1016, the channel encoder 1077, the controller/processor 1075 or the memory 1076.

The ordinary skill in the art may understand that all or part steps in the above method may be implemented by instructing related hardware through a program. The program may be stored in a computer readable storage medium, for example Read-Only Memory (ROM), hard disk or compact disc, etc. Optionally, all or part steps in the above embodiments also may be implemented by one or more integrated circuits. Correspondingly, each module unit in the above embodiment may be realized in the form of hardware, or in the form of software function modules. The disclosure is not limited to any combination of hardware and software in specific forms. The UE or terminal in the present disclosure includes but not limited to unmanned aerial vehicles, communication modules on unmanned aerial vehicles, telecontrolled aircrafts, aircrafts, diminutive airplanes, mobile phones, tablet computers, notebooks, wireless sensor, network cards, terminals for Internet of Things, REID terminals, communication modules for IOT, vehicle-mounted communication equipment, NB-IOT terminals, Machine Type Communication (MTC) terminals, enhanced MTC (eMTC) terminals, data cards, low-cost mobile phones, low-cost tablet computers, and other radio communication equipment. The base station or system equipment in the present application includes but not limited to macro-cellular base stations, micro-cellular base stations, home base stations, relay base station, gNB (NR node B), TRP, and other radio communication equipment.

The above are merely the preferred embodiments of the disclosure and are not intended to limit the scope of protection of the disclosure. Any modification, equivalent substitute and improvement made within the spirit and principle of the disclosure are intended to be included within the scope of protection of the disclosure.

What is claimed is:

1. A method in a User Equipment (UE) for power adjustment, comprising:
receiving downlink information;
receiving at least one first signaling; and
transmitting a first radio signal;
wherein:
the first radio signal is transmitted on a Physical Uplink Control Channel (PUCCH);
the first radio signal occupies at least one time unit in time domain, a number of time units included in the at least one time unit is T, and the T is used for determining a first component;
a first reference power is in linear correlation with the first component;
a transmit power of the first radio signal is a first power, and the first reference power is used for determining the first power;
the T is a positive integer;
the downlink information is used for determining configuration information of the first radio signal, the configuration information comprises at least one of occupied time domain resources, occupied frequency domain resources, occupied code domain resources, a cyclic shift, an Orthogonal Cover Code (OCC), a PUCCH format and a Uplink Control Information (UCI) content;
the at least one time unit is consecutive in time domain, any one of the at least one time unit is a duration of one Orthogonal Frequency Division Multiplexing (OFDM) symbol;
the first radio signal includes Uplink Control Information (UCI);
the first reference power is in unit of dBm, and the first power is in unit of dBm;
the first component is equal to a base-10 logarithm of the T; a linear coefficient between the first reference power and the first component is −10;
each of the at least one first signaling is used to respectively determine one of at least one first offset; a number of the at least one first signaling is equal to a number of the at least one first offset; the first reference power is in linear correlation with a summation of the at least one first offset; and a linear coefficient between the first reference power and the summation of the at least one first offset is 1.

2. The method according to claim 1, comprising:
receiving a second radio signal;
wherein a target first signaling is a latest first signaling among the at least one first signaling, the target first signaling comprises scheduling information of the second radio signal, and the scheduling information comprises at least one of occupied time domain resources, occupied frequency domain resources, a Modulation and Coding Scheme (MCS), a Hybrid Automatic Repeat reQuest-Acknowledgement (HARD) process number, a Redundancy Version (RV) and a New Data Indicator (NDI).

3. The method according to claim 1, wherein the first reference power is in linear correlation with a base-10 logarithm of T1, and the T1 is a positive integer; a linear coefficient between the first reference power and the base-10 logarithm of T1 is 10;
or, the first radio signal comprises at least one sub-signal, a number of sub-signals included in the at least one sub-signal is equal to the T, the at least one sub-signal is transmitted on the at least one time unit respectively, each of the at least one sub-signal carries a first bit block, and the first bit block comprises at least one bit;
or, the first power is a minimum one among a second power and the first reference power, the first reference power is in linear correlation with a second component, a third component and a fourth component respectively, linear coefficients between the first reference power and the second component, the third component and the fourth component are 1 respectively, the second component is a power reference of a PUCCH, the third component is correlated with a quality of a channel from the UE to a receiver of the first radio signal, and the fourth component is correlated with a format of the PUCCH;
or, the downlink information is carried by a Radio Resource Control (RRC) signaling.

4. The method according to claim 1, comprising:
receiving a second signaling;
wherein the second signaling is used for triggering transmission of the first radio signal;
or, comprising:
receiving a second signaling;
wherein the second signaling is used for triggering transmission of the first radio signal; the downlink information is used for determining M pieces of configuration information, the configuration information of the first radio signal is one of the M pieces of configuration information, the second signaling is used for determining the configuration information of the first radio signal from the M pieces of configuration information; the M is a positive integer greater than 1.

5. The method according to claim 1, wherein the first signaling comprises a first field, the first field in each of the at least one first signaling has a value equal to a first index, and the first index is a non-negative integer;
or, each of the at least one first signaling is a dynamic signaling;
or, each of the at least one first offset is indicated by Transmitter Power Control (TPC).

6. A method in a base station for power adjustment, comprising:
transmitting downlink information;
transmitting at least one first signaling; and
receiving a first radio signal; wherein:
the first radio signal is transmitted on a PUCCH;
the first radio signal occupies at least one time unit in time domain, a number of time units included in the at least one time unit is T, and the T is used for determining a first component;
a first reference power is in linear correlation with the first component;

a transmit power of the first radio signal is a first power, and the first reference power is used for determining the first power;

the T is a positive integer;

the downlink information is used for determining configuration information of the first radio signal, the configuration information comprises at least one of occupied time domain resources, occupied frequency domain resources, occupied code domain resources, a cyclic shift, an OCC, a PUCCH format or a UCI content;

the at least one time unit is consecutive in time domain, any one of the at least one time unit is a duration of one Orthogonal Frequency Division Multiplexing (OFDM) symbol;

the first radio signal includes Uplink Control Information (UCI);

the first reference power is in unit of dBm, and the first power is in unit of dBm;

the first component is equal to a base-10 logarithm of the T; a linear coefficient between the first reference power and the first component is −10;

each of the at least one first signaling is used to respectively determine one of at least one first offset; a number of the at least one first signaling is equal to a number of the at least one first offset; the first reference power is in linear correlation with a summation of the at least one first offset; and a linear coefficient between the first reference power and the summation of the at least one first offset is 1.

7. The method according to claim 6, comprising:
transmitting a second radio signal;
wherein a target first signaling is a latest first signaling among the at least one first signaling, the target first signaling comprises scheduling information of the second radio signal, and the scheduling information comprises at least one of occupied time domain resources, occupied frequency domain resources, an MCS, a HARQ process number, an RV and an NDI.

8. The method according to claim 6, wherein the first reference power is in linear correlation with a base-10 logarithm of T1, and the T1 is a positive integer; a linear coefficient between the first reference power and the base-10 logarithm of T1 is 10;
 or, the first radio signal comprises at least one sub-signal, a number of sub-signals included in the at least one sub-signal is equal to the T, the at least one sub-signal is transmitted on the at least one time unit respectively, each of the at least one sub-signal carries a first bit block, and the first bit block comprises at least one bit;
 or, the first power is a minimum one among a second power and the first reference power, the first reference power is in linear correlation with a second component, a third component and a fourth component respectively, linear coefficients between the first reference power and the second component, the third component and the fourth component are 1 respectively, the second component is a power reference of a PUCCH, the third component is correlated with a quality of a channel from the base station to a transmitter of the first radio signal, and the fourth component is correlated with a format of the PUCCH;
 or, the downlink information is carried by a RRC signaling.

9. The method according to claim 6, comprising:
transmitting a second signaling;
wherein the second signaling is used for triggering transmission of the first radio signal;
or, comprising:
transmitting a second signaling;
wherein the second signaling is used for triggering transmission of the first radio signal; the downlink information is used for determining M pieces of configuration information, the configuration information of the first radio signal is one of the M pieces of configuration information, the second signaling is used for determining the configuration information of the first radio signal from the M pieces of configuration information; the M is a positive integer greater than 1.

10. The method according to claim 6, wherein the first signaling comprises a first field, the first field in each of the at least one first signaling has a value equal to a first index, and the first index is a non-negative integer;
 or, each of the at least one first signaling is a dynamic signaling;
 or, each of the at least one first offset is indicated by TPC.

11. A UE for power adjustment, comprising:
a first receiver, to receive downlink information;
the first receiver, to receive at least one first signaling; and
a first transmitter, to transmit a first radio signal; wherein:
the first radio signal is transmitted on a PUCCH;
the first radio signal occupies at least one time unit in time domain, a number of time units included in the at least one time unit is T, and the T is used for determining a first component;
a first reference power is in linear correlation with the first component;
a transmit power of the first radio signal is a first power, and the first reference power is used for determining the first power;
the T is a positive integer;
the downlink information is used for determining configuration information of the first radio signal, the configuration information comprises at least one of occupied time domain resources, occupied frequency domain resources, occupied code domain resources, a cyclic shift, an OCC, a PUCCH format or a UCI content;
the at least one time unit is consecutive in time domain, any one of the at least one time unit is a duration of one Orthogonal Frequency Division Multiplexing (OFDM) symbol;
the first radio signal includes Uplink Control Information (UCI);
the first reference power is in unit of dBm, and the first power is in unit of dBm;
the first component is equal to a base-10 logarithm of the T; a linear coefficient between the first reference power and the first component is −10;
each of the at least one first signaling is used to respectively determine one of at least one first offset; a number of the at least one first signaling is equal to a number of the at least one first offset; the first reference power is in linear correlation with a summation of the at least one first offset; and a linear coefficient between the first reference power and the summation of the at least one first offset is 1.

12. The UE according to claim 11, wherein
the first receiver receives a second radio signal; wherein a target first signaling is a latest first signaling among the at least one first signaling, the target first signaling comprises scheduling information of the second radio signal, and the scheduling information comprises at least one of occupied time domain resources, occupied frequency domain resources, an MCS, an HARQ process number, an RV and an NDI.

13. The UE according to claim 11, wherein the first reference power is in linear correlation with a base-10 logarithm of T1, and the T1 is a positive integer; a linear coefficient between the first reference power and the base-10 logarithm of T1 is 10;
or, the first radio signal comprises at least one sub-signal, a number of sub-signals included in the at least one sub-signal is equal to the T; the at least one sub-signal is transmitted on the at least one time unit respectively, each of the at least one sub-signal carries a first bit block, and the first bit block comprises at least one bit;
or, the first power is a minimum one among a second power and the first reference power, the first reference power is in linear correlation with a second component, a third component and a fourth component respectively, linear coefficients between the first reference power and the second component, the third component and the fourth component are 1 respectively, the second component is a power reference of a PUCCH, the third component is correlated with a quality of a channel from the UE to a receiver of the first radio signal, and the fourth component is correlated with a format of the PUCCH;
or, the downlink information is carried by a RRC signaling.

14. The UE according to claim 11, wherein the first receiver receives a second signaling, wherein the second signaling is used for triggering transmission of the first radio signal;
or, the first receiver receives a second signaling; wherein the second signaling is used for triggering transmission of the first radio signal; the downlink information is used for determining M pieces of configuration information, the configuration information of the first radio signal is one of the M pieces of configuration information, the second signaling is used for determining the configuration information of the first radio signal from the M pieces of configuration information; the M is a positive integer greater than 1.

15. The UE according to claim 11, wherein the first signaling comprises a first field, the first field in each of the at least one first signaling has a value equal to a first index, and the first index is a non-negative integer;
or, each of the at least one first signaling is a dynamic signaling;
or, each of the at least one first offset is indicated by TPC.

16. A base station for power adjustment, comprising:
a second transmitter, to transmit downlink information;
the second transmitter, to transmit at least one first signaling; and
a second receiver, to receive a first radio signal; wherein:
the first radio signal is transmitted on a PUCCH;
the first radio signal occupies at least one time unit in time domain, a number of time units included in the at least one time unit is T, and the T is used for determining a first component;
a first reference power is in linear correlation with the first component;
a transmit power of the first radio signal is a first power, and the first reference power is used for determining the first power; and the T is a positive integer;

the downlink information is used for determining configuration information of the first radio signal, the configuration information comprises at least one of occupied time domain resources, occupied frequency domain resources, occupied code domain resources, a cyclic shift, an OCC, a PUCCH format or a UCI content;
the at least one time unit is consecutive in time domain, any one of the at least one time unit is a duration of one Orthogonal Frequency Division Multiplexing (OFDM) symbol;
the first radio signal includes Uplink Control Information (UCI);
the first reference power is in unit of dBm, and the first power is in unit of dBm;
the first component is equal to a base-10 logarithm of the T; a linear coefficient between the first reference power and the first component is −10;
each of the at least one first signaling is used to respectively determine one of at least one first offset; a number of the at least one first signaling is equal to a number of the at least one first offset; the first reference power is in linear correlation with a summation of the at least one first offset; and a linear coefficient between the first reference power and the summation of the at least one first offset is 1.

17. The base station according to claim 16, wherein the second transmitter transmits a second radio signal;
wherein a target first signaling is a latest first signaling among the at least one first signaling, the target first signaling comprises scheduling information of the second radio signal, and the scheduling information comprises at least one of occupied time domain resources, occupied frequency domain resources, an MCS, a HARQ process number, an RV and an NDI.

18. The base station according to claim 16, wherein the first reference power is in linear correlation with a base-10 logarithm of T1, and the T1 is a positive integer; a linear coefficient between the first reference power and the base-10 logarithm of T1 is 10;
or, the first radio signal comprises at least one sub-signal, a number of sub-signals included in the at least one sub-signal is equal to the T; the at least one sub-signal is transmitted on the at least one time unit respectively, each of the at least one sub-signal carries a first bit block, and the first bit block comprises at least one bit;
or, the first power is a minimum one among a second power and the first reference power, the first reference power is in linear correlation with a second component, a third component and a fourth component respectively, linear coefficients between the first reference power and the second component, the third component and the fourth component are 1 respectively, the second component is a power reference of a PUCCH, the third component is correlated with a quality of a channel from the base station to a transmitter of the first radio signal, and the fourth component is correlated with a format of the PUCCH;
or, the downlink information is carried by a RRC signaling.

19. The base station according to claim 16, wherein the second transmitter transmits a second signaling, wherein the second signaling is used for triggering transmission of the first radio signal;
or, the second transmitter transmits a second signaling; wherein the second signaling is used for triggering transmission of the first radio signal; the downlink information is used for determining M pieces of configuration information, the configuration information of the first radio signal is one of the M pieces of configuration information, the second signaling is used for determining the configuration information of the first radio signal from the M pieces of configuration information; the M is a positive integer greater than 1.

20. The base station according to claim 16, wherein the first signaling comprises a first field, the first field in each of the at least one first signaling has a value equal to a first index, and the first index is a non-negative integer;
   or, each of the at least one first signaling is a dynamic signaling;
   or, each of the at least one first offset is indicated by TPC.

* * * * *